US012572980B2

(12) United States Patent  
Kroculick et al.

(10) Patent No.: US 12,572,980 B2  
(45) Date of Patent: Mar. 10, 2026

(54) PRIVATE COMPANY SECURITIES CLEARING AND SETTLEMENT PLATFORM

(71) Applicant: Nasdaq Private Market, LLC, New York, NY (US)

(72) Inventors: Andrew Kroculick, New York, NY (US); Rotem David, New York, NY (US); Griffith Garrabrant, San Francisco, CA (US); Eric Folkemer, New York, NY (US)

(73) Assignee: Nasdaq Private Market, LLC, NY (US)

( * ) Notice: Subject to any disclaimer, the term of this patent is extended or adjusted under 35 U.S.C. 154(b) by 170 days.

(21) Appl. No.: 18/544,863

(22) Filed: Dec. 19, 2023

(65) Prior Publication Data

US 2024/0362712 A1 Oct. 31, 2024

Related U.S. Application Data

(60) Provisional application No. 63/503,306, filed on May 19, 2023, provisional application No. 63/462,163, filed on Apr. 26, 2023.

(51) Int. Cl.  
*G06Q 40/04* (2012.01)

(52) U.S. Cl.  
CPC .................................... *G06Q 40/04* (2013.01)

(58) Field of Classification Search  
CPC ...................................................... G06Q 40/04  
See application file for complete search history.

(56) References Cited

U.S. PATENT DOCUMENTS

| 6,856,970 B1 * | 2/2005 | Campbell | ............. G06Q 40/02 |
| | | | 705/37 |
| 11,625,783 B1 * | 4/2023 | Gordon, III | ......... H04L 9/0637 |
| | | | 705/37 |

(Continued)

FOREIGN PATENT DOCUMENTS

| KR | 20180078132 A * | 7/2018 | ............. G06Q 40/06 |
| WO | WO-03017164 A1 * | 2/2003 | ............. G06Q 40/04 |
| WO | WO-2019074443 A1 * | 4/2019 | ............. G06Q 30/08 |

OTHER PUBLICATIONS

Sherif, Mostafa H.: Standardization of Business-to-Business Electronic Exchanges, 2007, IEEE, pp. 193-206 (Year: 2007).*

(Continued)

*Primary Examiner* — Bijendra K Shrestha  
(74) *Attorney, Agent, or Firm* — Haynes and Boone, LLP

(57) ABSTRACT

A method implemented by a private company securities platform executing on a processor is provided. The method includes receiving an input in a non-standardized format and including non-standardized information. The method includes updating the non-standardized information into a standardized order format to generate a security order including standardized order data. The method includes automatically generating and transmitting a first notification including the standardized order data to an issuer. The transmitting of the first notification triggers a countdown for a transaction approval for the issuer. The method includes automatically generating and transmitting second notifications to all parties to the security order. The second notifications requests signatures for a transfer agreement including the standardized order data.

20 Claims, 17 Drawing Sheets

(56) References Cited

U.S. PATENT DOCUMENTS

| | | | | |
|---|---|---|---|---|
| 12,293,825 B2 * | 5/2025 | Gallopyn | ............... | G16H 10/20 |
| 2011/0106685 A1 * | 5/2011 | Silbert | ................... | G06Q 40/04 |
| | | | | 705/37 |
| 2012/0047059 A1 * | 2/2012 | Vasinkevich | .......... | G06Q 40/04 |
| | | | | 705/37 |
| 2012/0173403 A1 * | 7/2012 | Foley | .................... | G06Q 99/00 |
| | | | | 705/37 |

OTHER PUBLICATIONS

Werner, Druck & Median AG: Central Bank and payments in the Digital Era, 2020, BIS Annual Economic Report 2020, pp. 67-95 (Year: 2020).*

* cited by examiner

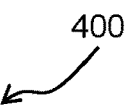
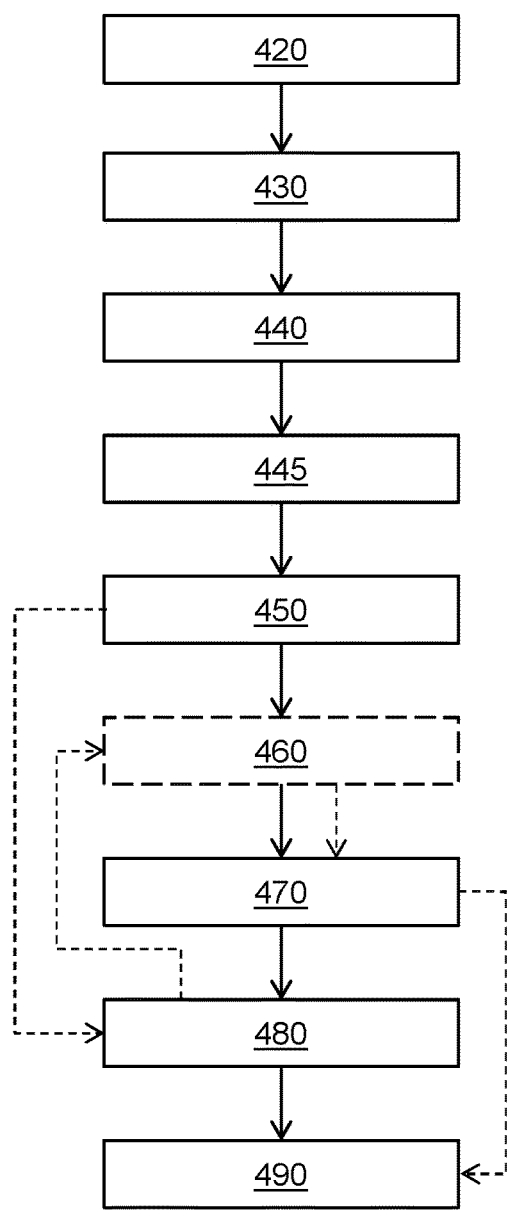
FIG. 4

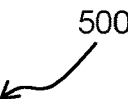

500

Notice Date:_____

RE:    Notice of Proposed Transfer of Securities of _____(the "Company")

By signing this Notice of Proposed Transfer of Securities of the Company (this "Transfer Notice"), the proposed seller listed below ("Proposed Seller") hereby provides written notice to the Company of Proposed Seller's intent to transfer the following securities of the Company (the "Securities") to the proposed buyer listed below ("Proposed Buyer") for the transfer price set forth below (the "Proposed Transfer"):

Securities to be Transferred:

Type, Class and Series:    _____

Number:    _____

Appx. Original Acquisition Date:    _____

Transfer Price:    $_____ per Security in U.S. Dollars

Proposed Buyer:

Name:    _____

Address:    _____

Entity Type:    _____

Jurisdiction of Organization:    _____

Furthermore, by signing this Transfer Notice, the Proposed Seller and the Proposed Buyer (together, the "Parties") agree as follows:

1. The Proposed Transfer is subject to the Company's transfer terms, including all applicable transfer restrictions, including, but not limited to, the Company's or its assignees' right of first refusal (or similar right, "ROFR"), and this Transfer Notice constitutes an offer to sell the Securities to the Company or one or more of the Company's assignees pursuant to the ROFR at the Transfer Price.

2. THIS TRANSFER NOTICE CONSTITUTES A BINDING COMMITMENT BY THE PARTIES TO CONSUMMATE THE PROPOSED TRANSFER IN THE EVENT THE COMPANY OR ITS ASSIGNEES DECLINE TO EXERCISE OR ASSIGN THE ROFR.

3. The Parties shall enter into a stock purchase or transfer agreement (and to the extent available from the Company, in the Company's form), which shall include representations and warranties by Proposed Seller as to Proposed Seller's ownership of the Securities, as well as other customary terms and conditions. The Parties shall negotiate and execute any such other documents as may be necessary to affect the Proposed Transfer. The Parties shall equally pay any transfer fees imposed by the Company in connection with the Proposed Transfer.

4. The Parties shall close the Proposed Transfer promptly (and in any event within 45 calendar days) of the Company or its assignees declining to exercise the ROFR or otherwise providing written notice of consent (or no non-consent) to the Proposed Transfer.

5. In the absence of the Company's written notice of consent (or no non-consent) to the Proposed Transfer on or prior to the later of (a) 120 calendar days from the Notice Date and (b) the number of days allotted to the Company pursuant to the ROFR, Proposed Seller or Proposed Buyer may unilaterally and irrevocably terminate this Transfer Notice by providing the other Party with written notice of such termination; provided, however, a Party shall not have the right to so terminate if the absence of such written notice of the Company was due in any way to any action or inaction of such Party.

6. The Parties are responsible for the completion of the Proposed Transfer in compliance with all transfer restrictions and all applicable laws, rules, regulations and orders of any governmental, judicial or regulatory authority or self-regulatory organization, including an applicable exemption from state and federal registration; the Parties' respective registered agents in the Proposed Transfer shall be third party beneficiaries to this Transfer Notice.

PROPOSED SELLER:

*If the Proposed Seller is an individual:*

_____
(Signature)

Name:_____

*If the Proposed Seller is an entity:*

Entity:_____

By:_____
(Signature)

Name:_____

Title:_____

PROPOSED BUYER:

*If the Proposed Buyer is an individual:*

_____
(Signature)

Name:_____

*If the Proposed Buyer is an entity:*

Entity:_____

_____
(Signature)

Name:_____

Title:_____

FIG. 5

600

Re: _____ (the "Company") Transfer Notice

By signing this "Transfer Notice", the "Seller" listed below is giving formal notice of the Seller's intent to transfer shares of the Company on the terms described below.

1. Purchase Price

Purchase Price (U.S. dollars per share):    $ _____

2. Information about the "Proposed Buyer"

Full Legal Name: _____

Address: _____

_____

Email Address: _____

Telephone: _____

Entity Type and Jurisdiction of Organization
(only if the Proposed Buyer is an entity): _____

3. Information about Shares to be transferred

Number of Option Shares to be
Exercised and Transferred: _____

Stock Option Grant Number(s): _____

Option Exercise Method: Proposed Buyer will fund the exercise amount directly to the Company prior to closing, for the account of Seller.

The Seller and Proposed Buyer acknowledge and agree that this proposed transfer of the Company's shares is subject to the Company's customary transfer terms, including all applicable transfer restrictions including but not limited to the Company's right of first refusal, and that this Transfer Notice constitutes an offer to sell the abovementioned shares to the Company or one or more of the Company's assignees pursuant to the Company's Right of First Refusal at the Purchase Price set forth above. THE SELLER AND PROPOSED BUYER AGREE THAT THIS TRANSFER NOTICE CONSTITUTES A BINDING COMMITMENT BY THE SELLER TO SELL THE ABOVEMENTIONED SHARES TO THE PROPOSED BUYER AND A BINDING COMMITMENT BY THE PROPOSED BUYER TO PURCHASE SUCH SHARES FROM THE SELLER IF THE COMPANY DECLINES TO EXERCISE OR ASSIGN ITS RIGHT OF FIRST REFUSAL. Should the proposed transfer described by this Transfer Notice not be approved in writing by the Company, due in no part to any action or inaction by the Proposed Buyer or the Seller, before one hundred twenty (120) calendar days following the date first written above, the Proposed Buyer or the Seller may unilaterally and irrevocably terminate this Transfer Notice by way of written notice to the other party.

SELLER:                                    PROPOSED BUYER:

Signed: _____     Signed: _____

Name: _____     Name: _____

Email: _____     Entity: _____

Title: _____

Date: _____ , _____

Re: _____ (the "Company") Transfer Notice

By signing this "Transfer Notice", each "Seller" listed on EXHIBIT A, incorporated herein by this reference, hereby, gives formal notice, pursuant to Section 3.02 of the Company Shareholders Agreement (the "Shareholders Agreement") of such Seller's intent to transfer shares of the Company on the terms and conditions hereinafter set forth and in the amounts set forth on the signature page attached hereto applicable to each such Seller.

1. Purchase Price

Purchase Price (U.S. dollars per share):    $x,xxx.xx _____

2. Information about the "Proposed Buyer"

Legal Name:    _____

Address:    _____

E-mail Address:    _____

Entity Type and Jurisdiction of Organization:    _____

Each Seller and the Proposed Buyer acknowledge and agree that this proposed transfer of the Company's shares is subject to the Company's customary transfer terms, including all applicable transfer restrictions including but not limited to the Company's right of first refusal, and that this Transfer Notice constitutes an offer to sell shares of the Company to the Company, or to one or more of the Company's assignees, pursuant to the Company's Right of First Refusal at the Purchase Price set forth above. EACH SELLER AND PROPOSED BUYER AGREE THAT THIS TRANSFER NOTICE CONSTITUTES A BINDING COMMITMENT BY EACH SELLER, SEVERALLY AND NOT JOINTLY, TO SELL THE SHARES OF THE COMPANY CONTEMPLATED HEREIN TO THE PROPOSED BUYER AND A BINDING COMMITMENT BY THE PROPOSED BUYER TO PURCHASE SUCH SHARES FROM EACH SELLER IN RESPECT OF WHICH THE COMPANY DECLINES TO EXERCISE OR ASSIGN ITS RIGHT OF FIRST REFUSAL.

1. Number and Type of Offered Shares to be transferred by the Offering Shareholders: [. ] Common Shares
2. The Identity of the Purchaser: (ie: xxxxx LLC) – Referenced Above (COI and Passport/ID attached to Offer)
3. Per Share Purchase Price: $x,xxx.xx/Share, no non-cash consideration ($0.00)
4. Benefits, Considerations, Payments, Arrangements with any Epic Party or Member of Board: Verifiably Zero/None
     The Proposed Date, Time and Location of the Closing of the Transfer, Not Less than 30 Days from Notice: [Proposed Closing Date], Noon PST, [Buyer Address].

PROPOSED BUYER:

By: _____
Name:
Title:

IN WITNESS WHEREOF, the Prospective Buyer and Seller have executed this Transfer Notice as of the date first written above.

SELLER:
By: _____
Name:
Address:
Email:
No. of Shares:
Aggregate Purchase Price:

EXHIBIT A
Schedule of Buyers

| BUYER | SHARES OF COMMON STOCK | PURCHASE PRICE |
|---|---|---|
| | | |
| TOTAL | | |

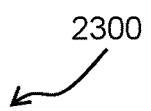
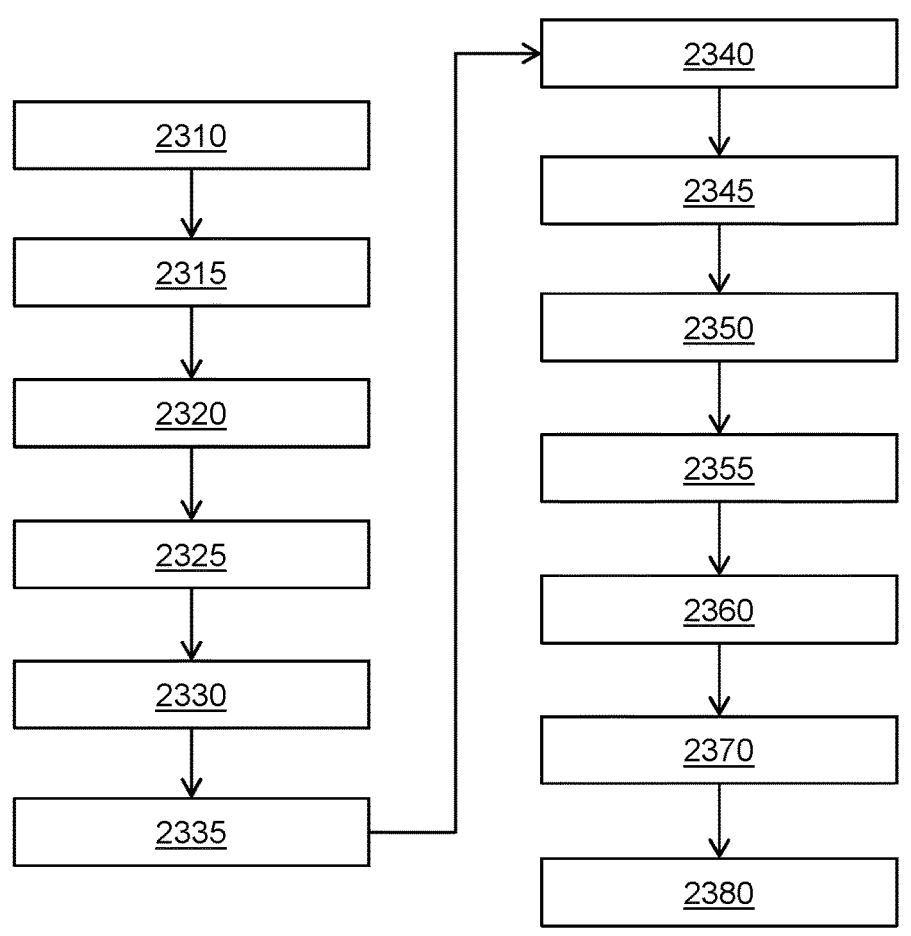
FIG. 23

PRIVATE COMPANY SECURITIES CLEARING AND SETTLEMENT PLATFORM

CROSS REFERENCE AND BENEFIT CLAIM

This application claims priority from U.S. Provisional Patent Application No. 63/462,163, entitled "PRIVATE COMPANY SECURITIES CLEARING AND SETTLEMENT," filed on Apr. 26, 2023 and U.S. Provisional Patent Application No. 63/503,306, entitled "PRIVATE COMPANY SECURITIES CLEARING AND SETTLEMENT PLATFORM," filed on May 19, 2023, both of which are hereby incorporated by reference as if set forth in full in this application for all purposes.

FIELD OF INVENTION

The description herein relates to efficient trading of private company stocks, and particularly to a method and system for a trusted, institutional marketplace for efficient trading of private company stocks that provides an open access service to efficiently settle private company transactions regardless of trading venue.

BACKGROUND

At present, companies wait a decade or more to go public. Prior to going public, these companies have an urgent need for liquidity. Accordingly, there is a $4 trillion market for private, pre-IPO company shares.

Conventional services are unable to assist with this urgent need for liquidity. That is, in trying to unlock the liquidity of private, pre-IPO company shares, not only do conventional services fail to provide standardized methods, centralized clearinghouses, or single electronic platforms for clearing and settling transactions involving any private company securities, the settlement process in these private company trades can typically be 90 to 120 days that has been in this market.

Thus, there is a need for a computer platform that can manipulate and improve non-standardized clearing and settling transactions into a fast (less than 90 days) standardized (universal to all users) settlement process.

SUMMARY

According to one or more embodiments, a method implemented by a private company securities platform executing on at least one processor is provided. The method includes receiving an input in a non-standardized format and including non-standardized information. The method includes updating the non-standardized information into a standardized order format to generate a security order including standardized order data. The method includes automatically generating and transmitting a first notification including the standardized order data to an issuer. The transmitting of the first notification triggers a countdown for a transaction approval for the issuer. The method includes automatically generating and transmitting a plurality of second notifications to all parties to the security order. The plurality of second notifications requests a plurality of signatures for a transfer agreement including the standardized order data.

According to one or more embodiments, a system implementing a private company securities platform is provided. The system includes at least one memory storing processor executable code for the private company securities platform. The system includes at least one processor executing the processor executable code. The processor executable code causes the private company securities platform and the system to receive an input in a non-standardized format and including non-standardized information and update the non-standardized information into a standardized order format to generate a security order including standardized order data. The processor executable code causes the private company securities platform and the system to automatically generate and transmit a first notification including the standardized order data to an issuer, the transmitting of the first notification triggering a countdown for a transaction approval for the issuer. The processor executable code causes the private company securities platform and the system to automatically generate and transmit a plurality of second notifications to all parties to the security order, the plurality of second notifications requesting a plurality of signatures for a transfer agreement including the standardized order data.

According to one or more embodiments, any of the methods and/or systems herein can be implemented a method, a device, an apparatus, and/or a system.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 4 depicts a method according to one or more embodiments;

FIG. 5 depicts an example transfer notice according to one or more exemplary embodiments;

FIG. 6 depicts an example transfer notice according to one or more exemplary embodiments;

FIG. 7 depicts an example transfer notice according to one or more exemplary embodiments.

FIG. 23 depicts a method according to one or more embodiments.

DETAILED DESCRIPTION

According to one or more embodiments, the private company securities platform provides a trusted, institutional marketplace for efficient trading of private company stocks. In this regard, the private company securities platform provides an open access service to efficiently settle private company transactions regardless of trading venue via a transfer and settlement (T&S) application or tool built for private companies, broker-dealers, and investors. For example, the T&S application or tool implements an end-to-end share transfer workflow and dashboard for private companies and broker-dealers to manage and monitor private stock transactions. The T&S application or tool manages all "clearing" and/or "settlement" aspects associated with the transfer and settlement of private company shares including clearing activities contemplated by a central clearinghouse and settlement activities for bilateral trades without a need for clearing. The T&S application or tool implements and automates complex and non-core administrative activities associated with the transfer and settlement of private company shares. The T&S application or tool manages secondary block settlements to meaningfully reduce back-office burdens on companies, investors, stockholders and brokers, regardless of trading venue, broker, or issuer.

Thus, one or more advantages, technical effects, and/or benefits of the private company securities platform (e.g., and the T&S application or tool thereof) include increasing computer/communication efficiencies, reducing settlement times, implementing effective and reliable settlements, and unlocking liquidity faster for companies and broker-dealers that is otherwise not currently available or currently performed by conventional services. In this regard, the private company securities platform improves the settlement process in private company trades by completing transaction with increased efficiency (e.g., along a shorter timeline) while instilling confidence in the private markets.

Figure 1:
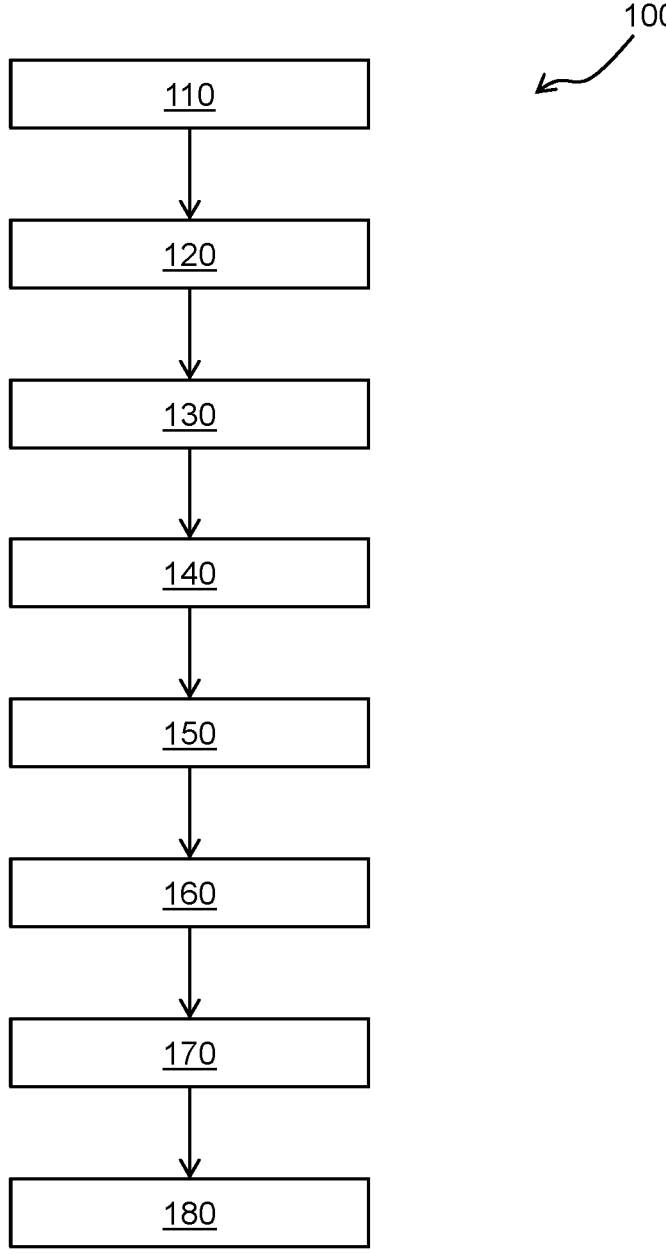
FIG. 1 depicts a method according to one or more embodiments.

FIG. 1 illustrates a method 100 according to one or more embodiments. The method 100 is implemented by the private company securities platform (also referred to as a private company securities clearing and settlement platform). The private company securities platform executes one or more operations of the method 100 in combination to execute security transfers. In support of the one or more operations, the private company securities platform can generate and display one or more user interfaces, graphic user interfaces (GUIs), and/or elements thereof that receive and provide data, inputs, notifications, messages, etc. as further described herein.

The method 100 begins at block 110, where the private company securities platform receives an input. The input can be information in a non-standardized format. The input can include any details of an order or intent to sell entered by a broker, buyer, seller, or other user. The input can include orders matched through the private company securities platform that meet requirements of both buyer and seller and includes firm orders. By way of example, the input can be provided to the private company securities platform in the form of any private company transaction or transfer notice uploaded to the private company securities platform, as well as an email, a phone call transcript, a direct user interface input or other mechanism to the private company securities platform.

Note that non-standardization refers to that there is no industry-wide standards for how information relating to any and all transfers is provided and received, as each transfer can have unique terms and require unique data and be embodied in different forms. For example, to the extent that some of the details of the information may be in a general format (e.g., a date is written as MM/DD/YYYY), there is no industry-wide standards for how to record a date. Further, one broker may use a first form that requires a date in a first general format for all transfers that the one broker initiates, while another broker may not use any form and instead has a table in an email with a date in a second general format.

According to one or more embodiments, after a transfer notice is finalized by a buyer and a seller, the private company securities platform receives the transfer notice on behalf of the company. Further, after details of an order are finalized by a buyer and a seller, the private company securities platform generates a transfer notice from the order details and provides the transfer notice to the company (e.g., starting with order details of one side of the trade and ending with the private company securities platform delivering the transfer notice to a company to begin the process).

According to one or more embodiments, the T&S application or tool of the private company securities platform receives one or more stock transfer notices. Each stock transfer notice is in a non-standardized format and includes non-standardized information, for example terms reached on a potential or on an actual sale or transfer (for example, a sale of a security). An example of a transfer notice can include, but is not limited to, a stock transfer notice (STN), a security order and details thereof, or a combination of both.

At block 120, the private company securities platform updates the input. The private company securities platform updates non-standardized information of the input into a standardized order format. Further, the private company securities platform updates the non-standardized information of the input into the standardized order format to generate a security order including standardized order data. According to one or more embodiments, the private company securities platform can be directed by one or more user inputs (e.g., as received by the one or more user interfaces or GUIs) to update the non-standardized information into the standardized order format.

According to one or more embodiments, the T&S application or tool of the private company securities platform automatically updates the non-standardized information of the one or more stock transfer notices (e.g., upon receipt) into a standardized order format. The operation of automatically updating the non-standardized information into the standardized order format generates one or more security orders that include standardized order data. Each security order can include one or more of a buyer name, a seller name, shares being transferred, price per share, and issuer name in the standardized order format. Each security order can include a legal entity name when the buyer or seller is an entity. Each security order can include company identifiers (e.g., committee on uniform securities identification procedures (CUSIP) numbers or other company numbers), transfer details that have yet to receive approval, multiple share classes, price per share, company valuation that will translate into a price per share, and anonymous account identifiers (e.g., financial industry regulatory authority (FINRA) numbered accounts). Each security order can include ownership data that is either verified or copied directly from a capitalization table platform or equity administration database, for example certificate identifications, share class(es), acquisition dates, and other data (e.g., note that data is not required to be removed from the capitalization table to facilitate a transfer). Each security order is stored by the private company securities platform.

At block 130, the private company securities platform stores the security order within the private company securities platform. The private company securities platform can automatically store the security order. By automatically storing the standardized order data, the private company securities platform includes the technical effect and benefit of generating and tracking documents to reduce misplacing information or requiring rework to sign multiple documents of a same format and substance.

At block 140, the private company securities platform utilizes the one or more security orders stored therein to populate a user interface so that all parties to each security order can access and interact with corresponding security orders. Populating the one or more user interface includes, but is not limited to, dashboard population, account creation, legal document generation, transaction confirmation, paying agent process, tax reporting process, and tax document generation, and notification generation. According to one or more embodiments, the private company securities platform utilizes the one or more security orders to support a paying agent process and/or tax reporting process as described herein. For example, by automatically populating legal documents, the private company securities platform reduces errors. According to one or more embodiments, the private company securities platform utilizes the one or more user interface to enable account creation on a per order basis and in parallel to the method 100.

At block 150, the private company securities platform automatically generates and transmits a first notification. A notification, generally, can be any alert, message, or other communication that includes data or information and is provided to one or more users. A notification can be provided in any form, for example a text message, an email, a push notification provided as an interface element (e.g., a pop-up, a bubble, or a banner), a voice message, a phone call, an instant message, a direct message, or other mechanism. The first notification can include the standardized order data to an issuer. The first notification can also include any transfer approval. Generally, a transfer approval is a decision point for users of the private company securities platform. A transfer approval can include, but is not limited to, a right of first refusal ("ROFR"), co-sale rights, or other transfer restrictions that require affirmative consent to be waived. The first notification can include an indication that any of the data described herein is available on the private company securities platform and viewable via the one or more user interfaces. The transmitting of the first notification can trigger a countdown for ROFR for the security. Note that because the transfer approval process (e.g., a ROFR process) may include preferred investors or another party that has not yet been identified, the private company securities platform can gather approval beyond issuer administrators or initial parties. According to one or more embodiments, the T&S application or tool of the private company securities platform automatically generates one or more notifications including the standardized order data for each security order and transmits the one or more notifications to all corresponding parties. By providing automated notifications, the private company securities platform eliminates email traffic and reduces the potential for missed communications. The automated notifications of the private company securities platform include operational capabilities to work hand-in-hand with any offline communication mechanism. The countdown can be based on the issuance of the one or more notifications and can be relative to a ROFR for one of the parties.

At block 160, the private company securities platform automatically generates and transmits a plurality of second notifications to all parties to the security order. The plurality of second notifications requesting a plurality of signatures for one or more documents, for example, a transfer agreement (e.g., a stock transfer agreements or STA), an investor agreement, and/or an option exercise notice. These one or more documents can be automatically generated by the private company securities platform based on the standardized order data. These one or more documents can include the standardized order data. According to one or more embodiments, the T&S application or tool of the private company securities platform automatically generates and transmits notifications for signatures to all corresponding parties for a transfer agreement.

At block 170, the private company securities platform initiates a wiring of funds. According to one or more embodiments, the T&S application or tool of the private company securities platform automatically initiates wire transfers of money once the transfer agreement is fully executed (e.g., upon receipt of the plurality of signatures), receiving the gross proceeds from the buyer, and/or upon receiving the applicable transfer fees from the buyer and the seller. Thus, the private company securities platform (e.g., a paying agent) reduces the amount of risk parties (e.g., a broker) take on with respect to getting paid for a transaction. More broadly, the private company securities platform provides the technical effect and benefit of reducing risk for all parties (e.g., not just the party being paid), as the private company securities platform can ensure that all fees are paid and exercise costs and tax withholdings are sent to the company.

At block 180, the private company securities platform automatically generates a transaction confirmation and/or a transaction summary. In this regard, the private company securities platform provides standardized reporting (e.g., in the form of the transaction confirmation and/or the transaction summary) on all transactions that can be used by all parties to update internal records. The data of the transaction confirmations and/or the transaction summaries generated by the private company securities platform can be used for updating cap tables, ownership records, and other information. The data of the transaction confirmations and/or the transaction summaries generated by the private company securities platform do not require any data to be removed from current capitalization tables.

According to one or more embodiments, the T&S application or tool of the private company securities platform automatically generates transaction confirmations and/or transaction summaries once the transfer agreement is fully executed. Thus, the private company securities platform (e.g., a paying agent) reduces a settlement time for an overall settlement process, which further reduces settlement risk for all parties. Note that the wiring of money and the transaction confirmation/summaries can occur in tandem, parallel, etc. Further, note that the private company securities platform provides additional technical effect and benefits by generating the transaction confirmations to increase communication efficiencies by providing all parties with standardized transaction details post-close. Furthermore, preferred buyers (e.g., users who have advanced approval or designations as acceptable inventors) can engage the private company securities platform at any time during the method 100 and other methods herein, for example, because not all transfers need or use transaction confirmations. In this regard, for example, a preferred buyer can engage the private company securities platform at document signing after an issuing company has gone through one or more operations of the method 100. Additionally, the transaction summary created by the private company securities platform can provide transaction details without the need to meet the regulatory requirements associated with transaction confirmations.

Thus, the private company securities platform includes processor executable code or software that is necessarily rooted in process operations by processing hardware. In turn, the processing hardware and the private company securities platform execute process operations of the method 100. These process operations can happen in alternative combinations, orders, and iterations to execute security transfers and include converting non-standardized form to a standardized format, automatically generating a notifications based on stored information, and transmitting the message to all of the users. Note that the private company securities platform can include machine learning and/or artificial intelligence ("ML/AI"), models, neural networks, optical character recognition, security keys, non-fungible tokens, and other computer process operations to implement the security transfers. Thus, one or more advantages, technical effects, and/or benefits of the process operations of the method 100 include increased computer/communication efficiencies, reduced settlement times, effective and reliable settlement, and unlock liquidity faster for companies, shareholders, and broker-dealers that is otherwise not currently available or currently performed by conventional services.

Figure 2:
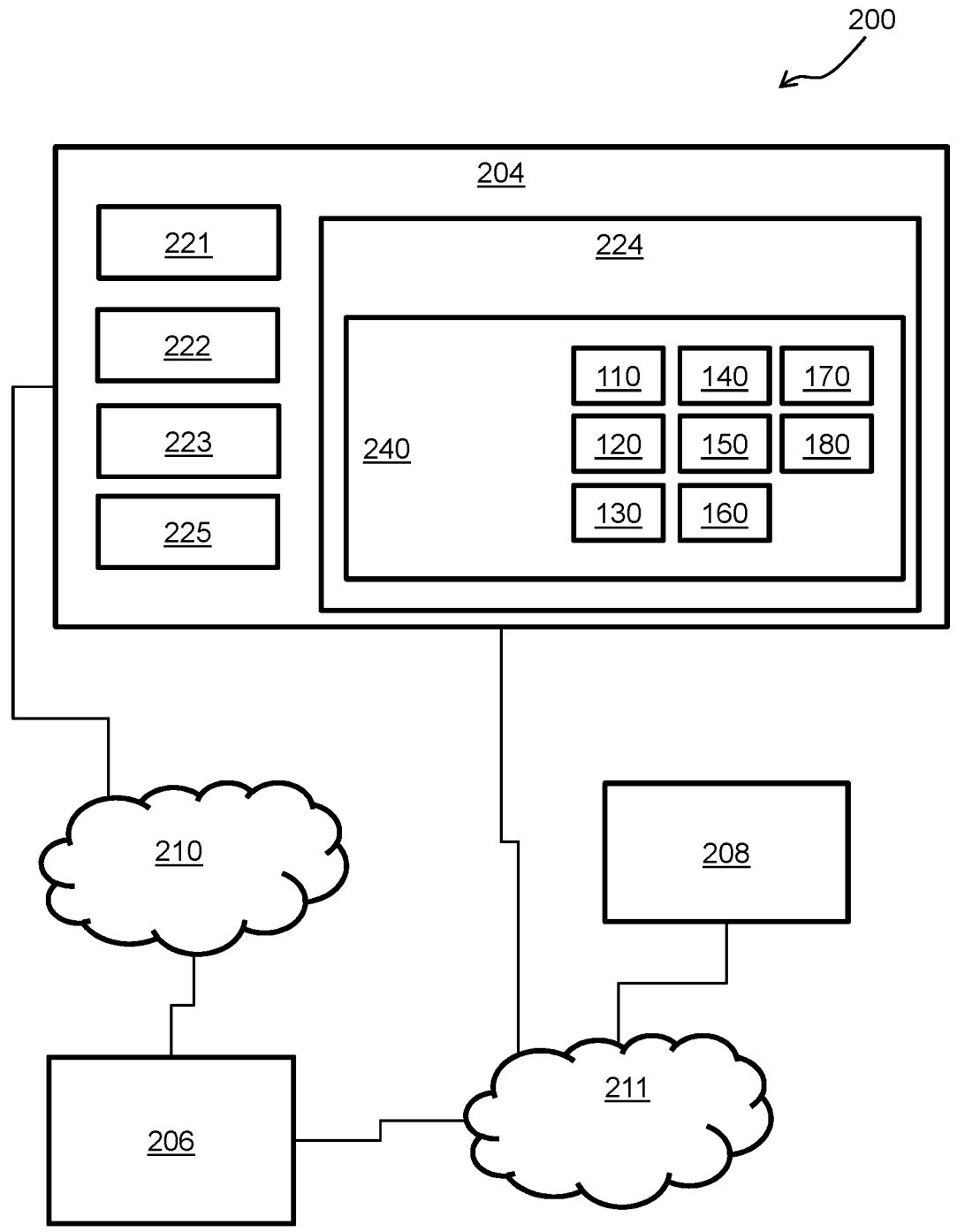
FIG. 2 depicts a diagram of a system according to one or more embodiments.

Turning now to FIG. 2, a diagram of a system 200 in which one or more features of the disclosure subject matter can be implemented is illustrated according to one or more exemplary embodiments. The system 200 includes a device 204, a first computing device 206, a second computing system 208, a first network 210, and a second network 211. Further, the device 204 can include an output component 221, a processor 222, a user input (UI) sensor 223, a memory 224, and a transceiver 225. The system 200 includes an engine 240.

Accordingly, the device 204, the first computing device 206, and/or the second computing system 208 can be programed to execute computer instructions with respect to the engine 240. As an example, the memory 224 stores these instructions for execution by the processor 222 so that the device 204 can receive and process the input via the user input (UI) sensor 223. Note that the processor 222 and the memory 224 are representative of processors and memories of the first computing device 206 and/or the second computing system 208.

The device 204, the first computing device 206, and/or the second computing system 208 can be any combination of software and/or hardware that individually or collectively store, execute, and implement the engine 240, and functions thereof. Further, the device 204, the first computing device 206, and/or the second computing system 208 can be an electronic, computer framework including and/or employing any number and combination of computing device and networks utilizing various communication technologies, as described herein. The device 204, the first computing device 206, and/or the second computing system 208 can be easily scalable, extensible, and modular, with the ability to change to different services or reconfigure some features independently of others.

The networks 210 and 211 can be a wired network, a wireless network, or include one or more wired and wireless networks. According to an embodiment, the network 210 is an example of a short-range network (e.g., local area network (LAN), or personal area network (PAN)). Information can be sent, via the network 210, between the device 204 and the first computing device 206 using any one of various short-range wireless communication protocols, for example Bluetooth, Wi-Fi, Zigbee, Z-Wave, near field communications (NFC), ultra-band, Zigbee, or infrared (IR). Further, the network 211 is an example of one or more of an Intranet, a local area network (LAN), a wide area network (WAN), a metropolitan area network (MAN), a direct connection or series of connections, a cellular telephone network, or any other network or medium capable of facilitating communication between the first computing device 206 and the second computing system 208. Information can be sent, via the network 211, using any one of various long-range wireless communication protocols (e.g., TCP/IP, HTTP, 3G, 4G/LTE, or 4G/New Radio). Note that for either network 210 and 211 wired connections can be implemented using Ethernet, Universal Serial Bus (USB), RJ-11 or any other wired connection and wireless connections can be implemented using Wi-Fi, WiMAX, and Bluetooth, infrared, cellular networks, satellite or any other wireless connection methodology.

In operation, the device 204 can obtain, monitor, store, process, and communicate via network 210 inputs, information, and outputs. Further, the device 204, the first computing device 206, and/or the second computing system 208 are in communication through the networks 210 and 211 (e.g., the first computing device 206 can be configured as a gateway between the device 204 and the second computing system 208). For instance, the device 204 can be an example of the system 100 of FIG. 1 configured to communicate with the first computing device 206 via the network 210. The first computing device 206 can be, for example, a stationary/standalone device, a base station, a desktop/laptop computer, a smart phone, a smartwatch, a tablet, or other local device configured to communicate with other devices via networks 211 and 210. The second computing system 208, implemented as a physical server on or connected to the network 211, as a virtual server in a public cloud computing provider (e.g., Amazon Web Services (AWS)®) of the network 211, or another remote device, can be configured to communicate with the first computing device 206 via the network 211. Thus, the inputs, the information, and the outputs can be communicated throughout the system 200.

The processor 222, in executing the engine 240, can be configured to receive, process, and manage the inputs acquired by the UI sensor 223, and communicate the inputs to the memory 224 for storage and/or across the network 210 via the transceiver 225. The inputs from one or more other apparatuses can also be received by the processor 222 through the transceiver 225.

The engine 240 can perform a plurality of operations when executed by the processor 222. By way of example, and as shown in FIG. 2, engine 240 can perform the plurality of operations corresponding to the method 100 and blocks 110, 120, 130, 140, 150, 160, 170, and 180, which are processor executable instructions within the engine 240 and memory 244.

According to one or more embodiments, the engine 240 can include one or more application programming interfaces (API), API protocols, or other communication architectures, for example including but not limited to GUIs, representational state transfer (REST) API, distributed event store, remote procedure call (RPC), simple object access protocol (SOAP), file transfer protocol (FTP), and secure file transfer protocol (SFTP), or other endpoints that address conventional systemic issues and streamline settlement processes. Utilizing the one or more application programming interfaces (API), the API protocols, or the other communication architectures, the engine 240 can include provides a dashboard (e.g., within one or more user interface or GUIs), storing and populating STAs, centralizing STNs requests in the dashboard, processing capitalization tables (e.g., whether internal and/or external), automatically updating capitalization tables (e.g., whether internal and/or external), and updating books and records (for partners) once trades are complete. The engine 240 can include one or more APIs or other endpoints that verify holdings and track ROFR statutes. ROFR status can include, but are not limited to, pending, accepted, rejected, blocked, waived, and hold. For example, issuers through the engine 240 can verify holdings prior to a transfer execution and download complete investor questionnaires. Further, brokers and issuers through the engine 240 can review buyer and seller submissions. The engine 240 can include one or more APIs or other endpoints that process transfers when matches (between buyers and sellers) occur. Note that combined buy and sell orders can be considered a transfer, which is referred to as a match on the engine 240. Thus, security orders herein can be representative of transfers when referring to combined orders. The engine 240 can include one or more APIs or other endpoints that provide and implement issuer and broker-specific processes to interact with participants, for example, custom STNs, buyer and seller onboarding, transfer approval processes (e.g., ROFR processes), STAs, and flow of funds (e.g., wiring funds).

The engine 240 can include one or more APIs or other endpoints that track transfer activity, for example, in real time. For example, the engine 240 can monitor trade activity through various dashboards, enable users to track STA execution, and view submissions, participants, and transfers in progress (e.g., all in real time). The engine 240 can include one or more APIs or other endpoints that utilize/provide paying agent capabilities. For example, the engine 240 can collect and store payment instructions for buyer and seller entities, create custom flow of funds for broker commissions, issuer transfer fees, and seller proceeds, as well as provide trade confirmations and 1099B tax forms.

The engine 240 can include one or more APIs or other endpoints that support process standardization. For example, as a broker-agnostic provider, the engine 240 can match private company transfers, standardize processes, and provide onboarding for buyers and sellers. The engine 240 can include one or more APIs or other endpoints that provide history of activity. For example, the engine 240 can provide access to historical events to review previous transfers, download company reports, and use secondary trade data to compare transactions against those of peers on an anonymized basis.

Accordingly, the engine 240 can include one or more APIs or other endpoints that manage secondary market transactions at more than $45 billion in transactional value across over 650 company-sponsored liquidity programs for venture-backed private companies, as well as for over 160,000 individual shareholders and investors.

The output component 221 includes and is representative of, for example, any device, transducer, speaker, touch screen, and/or indicator configured to provide outputs by audio, video, touching, etc. The output component 221 may include, for example, a speaker configured to convert one or more electrical signals into audible sounds.

The UI sensor 223 includes and is representative of, for example, any device, transducer, touch screen, and/or sensor configured to receive a user input by audio, video, touching, etc. The UI sensor 223 may include, for example, one or more transducers configured to convert one or more environmental conditions into an electrical signal, such that different types of audio are observed/obtained/acquired. The UI sensor 223 may include, for example, a touch screen interface integrated into a display (e.g., the output component 221).

The memory 224 is any non-transitory tangible media, for example, magnetic, optical, or electronic memory (e.g., any suitable volatile and/or non-volatile memory, random-access memory, or a hard disk drive). The memory 224 stores the computer instructions for execution by the processor 222. The memory 224 stores data 224a, which is representative of security orders, STNs, STAs, non-standardized data, and other data described herein.

The transceiver 225 may include a separate transmitter and a separate receiver. Alternatively, the transceiver 225 may include a transmitter and receiver integrated into a single device. The transceiver 225 enables communication with other software and components of the system 200.

In operation, the system 200, utilizing the engine 240 and other software and components therein, generates information responsive to a input and provides an output. For example, the device 204 utilizes the memory 224, and shares portions and/or all information across the system 200 via the transceiver 225 to implement the operations of the system. The operations of the system 200, for example, the operations of the engine 240, can include utilizing models, neural networks, and/or ML/AI that generate information based on a input and generate an output from the information.

Figure 3:
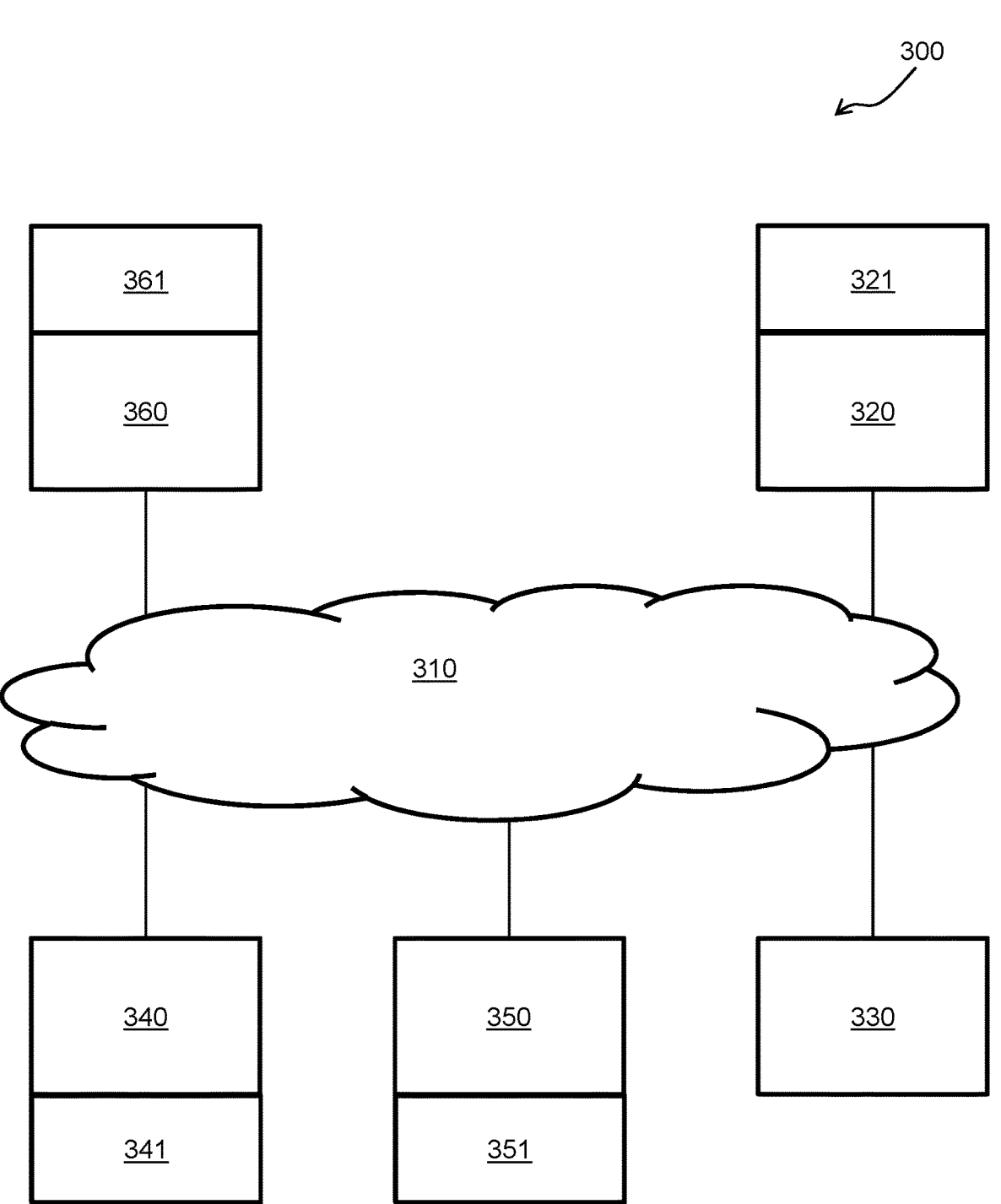
FIG. 3 depicts a diagram of a system according to one or more embodiments.

FIG. 3 depicts a diagram of a system 300 according to one or more exemplary embodiments. The system 300 includes a network 310, a platform 320 supporting a software tool 321, a company system 330, a first party system 340 supporting a buyer 341, a second party system 350 supporting a seller 351, and a third party system 360 supporting a capitalization table provider 361.

FIG. 4 depicts a method 400 according to one or more exemplary embodiments. The method 400 is an example of one or more operations of the system 300 and can be performed in orders other than as shown. Further, features and elements of the system 300, as well as the one or more corresponding one or more operations of the system 300 as represented by the method 400, can be performed individually or in combination in any of an online environment, an offline environment, a backend processing environment, a local processing environment, a remote processing environment, a cloud processing environment, and/or other environment. Thus, the platform 320 and the software tool 321 can be provided and executed as a standalone service or integrated with a broader offering of other services related to shareholder equity administration.

According to one or more embodiments, the platform 320, the company system 330, the first party system 340, the second party system 350, and the third party system 360 can be any computing system (e.g., the device 204, the first computing device 206, and/or the second computing system 208) and include any hardware and software as needed to execute the method 400. The platform 320 is an example of the private company securities platform implemented as a server and the software tool 321 is an example of the T&S application or web-based tool, as described herein. The platform 320 and the software tool 321 can connect and communicate via the network 310 to the company system 330, the first party system 340, the second party system 350, and the third party system 360 as needed to execute the method 400. The company system 330, the first party system 340, the second party system 350, and the third party system 360 can connect and communicate to the platform 320 and the software tool 321 as needed to execute the method 400 (e.g., the systems 330, 340, 350, and 360 access the platform 320 using a web browser that load a user interface of the software tool 321). The company system 330, the first party system 340, the second party system 350, and the third party system 360 can optionally include client instances of the software tool 320, or independent instances, as needed to execute the method 400. Thus, the system 300 contemplates implementing web-server, client-server, local processing, and/or other models. The seller 351 and the buyer 341 can be representative of one or more users (whether sellers or buyers themselves, and/or brokers on behalf of the sellers or buyers) interacting with the first and second party systems 340 and 350.

Generally, the platform 320 (e.g., T&S product) provides the software tool 321 as a software/hardware workflow tool that automates one or more portions of a clearing and settlement process (e.g., the method 400), including order management, populating legal share transfer documents, creating trade confirmations, collecting and storing payment, wiring instructions, and sending notifications to participants. The software 300, the platform 320, and the software tool 321 can be used by any issuer, broker, and/or investor (e.g., the seller 351 and the buyer 341) for private company shares transfers and standardizes the clearing and settlement process (regardless of transfer restrictions or rights by the issuer or investor, respectively).

The method begins at block 420, where the platform 320 and/or the software tool 321 receives an STN, as a notification, or email including the STN. The platform 320 and/or the software tool 321 can also receive proposed transfer details that serve as the notice or STN. According to one or more embodiments, the STN can be received in any format from any participant to any issue (e.g., a transfer notice in a non-standardized format and including non-standardized information).

Turning to FIG. 5, an example transfer notice 500 is shown according to one or more exemplary embodiments. All information of the example transfer notice 500 can be digitized (e.g., by optical character recognition (OCR)) and utilized (e.g., processed as inputs) by the platform 320. Examples of the information include at least 'Securities to be Transferred'.

Turning to FIG. 6, an example transfer notice 600 is shown according to one or more exemplary embodiments. All information of the example transfer notice 600 can be digitized (e.g., by optical character recognition (OCR)) and utilized (e.g., processed as inputs) by the platform 320. Examples of the information include at least 'Information about Shares to be transferred'.

Turning to FIG. 7, an example transfer notice 700 is shown according to one or more exemplary embodiments. All information of the example transfer notice 700 can be digitized (e.g., by optical character recognition (OCR)) and utilized (e.g., processed as inputs) by the platform 320. Examples of the information include at least 'Number and Type of Offered Shares to be transferred by the Offering Shareholders'.

Returning to FIG. 3, the system 300 accommodates any format for the STN because there are no standardized methods or mechanism for notices regarding buyer, seller, and price per share (e.g., note that the 'Securities to be Transferred' of the example transfer notice 500, the 'Information about Shares to be transferred' of the example transfer notice 600, and the 'Number and Type of Offered Shares to be transferred by the Offering Shareholders' of the example transfer notice 700 illustrate how there is no industry-wide standards for providing and receiving share information). In some cases, prior to the STN, the platform 320 and/or the software tool 321 can match the buyer and the seller.

By way of example, an equity administrator at a private company or a broker for private company shares can provide a STN to the platform 320 after a buyer and seller have reached terms on a sale of private company securities. Note that the equity administrator can be representative of any representative from the company, buyer, and/or seller in a particular transaction. In response to the STN, the platform 320 and/or the software tool 321 notifies the company 340 of the STN. This notification starts a ROFR countdown. The length of the ROFR countdown can be configured or selected from a range, for example, 0 days to 30 days. The ROFR countdown is tracked on the platform 320.

Additionally, in response to the STN, the platform 320 and/or the software tool 321 updates the non-standardized information from the STA into a standardized order format to generate a security order including standardized order data (including any matched data between the buyer and the seller). In the case of FIGS. 5-7, each transfer notice 500, 600, and 700 can be digitized and converted int the standardized order format. According to one or more embodiments, updating the non-standardized information can be performed automatically by the platform 320 and/or the software tool 321. The security order includes standardized order data, for example, a buyer name (e.g., a name of the buyer 341), a seller name (e.g., a name of the seller 351), shares being transferred, price per share, and issuer name (e.g., a name of a company that owns the company system 320) in the standardized order format. According to one or more embodiments, the security order includes the buyer and seller name, shares being transferred, price per share, and issuer name. Note that combined buy and sell orders can be considered a transfer, which is referred to as a match on the platform 320 and/or the software tool 321. Thus, security orders herein can be representative of transfers when referring to combined orders. The platform 320 and/or the software tool 321 can store the security order, the STNs, the STAs, any non-standardized data, and other data described herein. By automatically storing the standardized order data, for example, the platform 320 and/or the software tool 321 can generate and track documents to reduce misplacing information or requiring rework to sign multiple documents of a same format and substance.

Returning to FIG. 4, at block 430, the platform 320 and/or the software tool 321 populates a user interface, for example, a dashboard. The platform 320 and/or the software tool 321 can includes multiple interfaces or dashboards respective to each party involved in a security order. Additional operations of the platform 320 and/or the software tool 321 include account creation for dashboard access, uploading legal documents into the dashboard, tracking transactions in the dashboard, tracking ROFR in the dashboard, tracking confirmations in the dashboard, updating/editing a capitalization table, generating/providing inputs for updating/editing a capitalization table, and providing tax documents (i.e., 1099B) within the dashboard.

Figure 8:
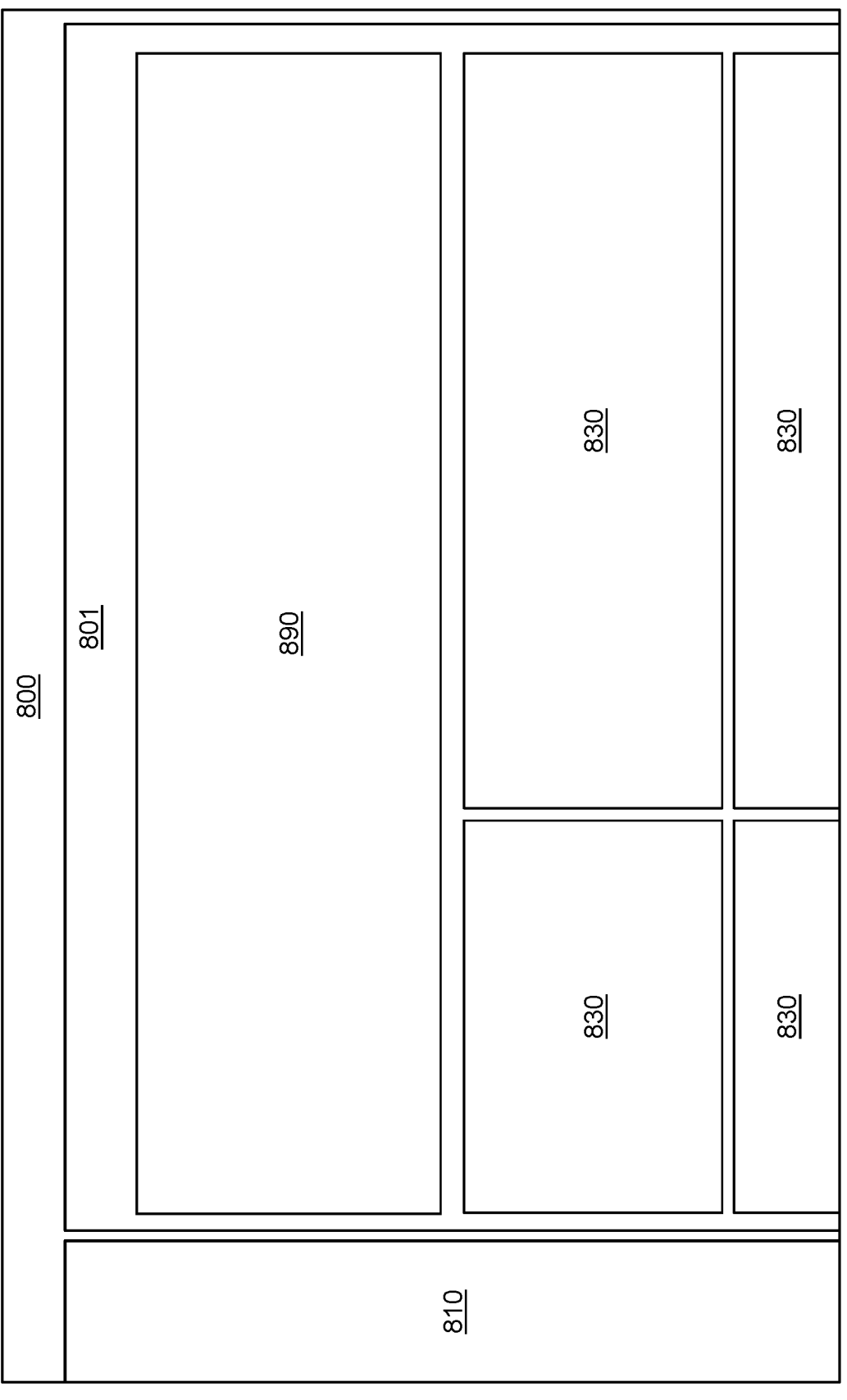
FIG. 8 depicts an example user interface according to one or more embodiments.
Figure 9:
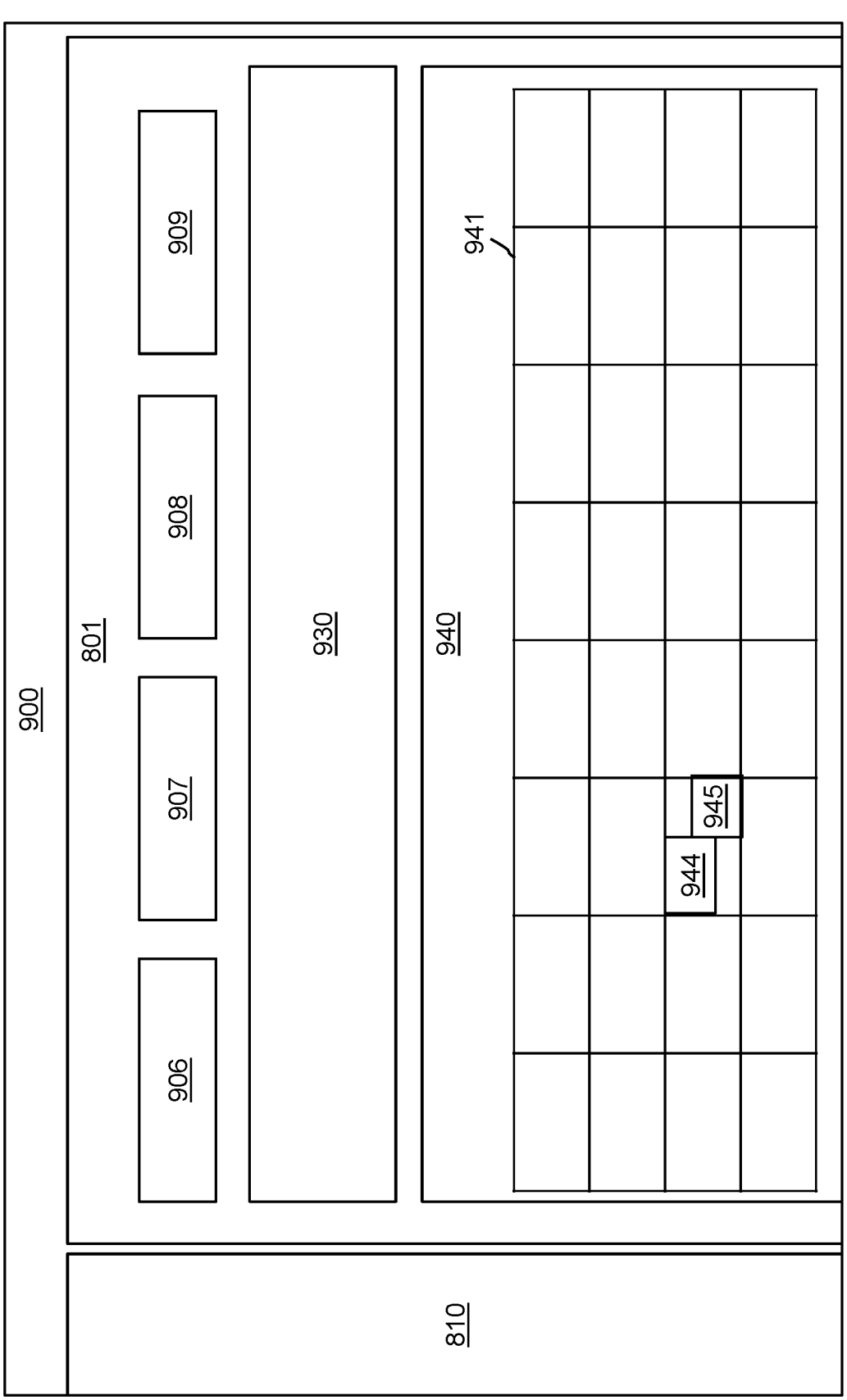
FIG. 9 depicts an example user interface according to one or more embodiments.

Turning to FIGS. 8-9, example user interfaces (e.g., including issuer and investor dashboards) are depicted according to one or more exemplary embodiments. FIG. 8 depicts an example user interface 800 of an issuer workstation according to one or more embodiments. The example user interface 800 includes a central frame 801 that is manipulated by selections within a toolbar frame 810. The toolbar frame 810 can include selectable menu items, for example general, marketplace, and programs. Under general, a dashboard for investors and a dashboard for stakeholders can be selected. Under marketplace, options for issuance, unverified holdings, holdings, matches, agreements, and transaction confirmations can be selected. Under programs, options for active programs and expired programs can be selected.

A 'transfer and settlement' dashboard can be access by selecting a dashboard option under the general menu item of the toolbar frame 810. When the 'transfer and settlement' dashboard is accessed, the central frame 801 can include an active program frame 820, an active items frame 830, an insights frame 840, a shares transferred fame 850, and a history frame 860. The active program frame 820 can include a table that list selectable programs for further investigation. The table can be a product of a search and can include one or more data columns, for example company, program, type, tole, status, rules and procedures, data room, and orders. The active items frame 830 can include selectable elements for verifying holdings, managing ROFRs, and singing STAs. The insights frame 840 can provides information on trading, for example total transaction volume, transaction volume, and transaction price range. The shares transferred fame 850 can provide graphical information of shares transferred. The history frame 860 can depict the trade history over time, with one or more selectable time ranges (e.g., all-time, last six (6) months, etc.).

FIG. 9 depicts an example user interface 900 of the issuer workstation according to one or more embodiments. A 'matches' dashboard can be access by selecting a matches option under the marketplace menu item of the toolbar frame 810. When the 'matches' dashboard is accessed, the central frame 801 can include one or selectable windows 906, 907, 908, and 909. For instance, a window 906 can show matches, a window 907 can show unique buyers, a window 908 can show unique sellers, and a window 909 can show filled quantities. Further, the central frame 801 can include a search frame 930 and a match frame 940. The search frame 930 enables searching and populating of the match frame 940, for example by using text search, action required, signature in progress, ready to settle, settled, funded, and wired credentials. The match frame 940 can include a table 941 that list selectable matches for further investigation. The table 941 can be a product of a search and can include one or more data columns, for example match identification, issuance, buy order identification, sell order identification, type, unique identification, series, state, currency, offered quantity, filled quantity, price, gross proceed, net proceeds, buyer fee, seller fee, tax withholdings, other withholdings, created at, updated at, and settlement date. The data columns can be considered an example of generating a standardized order format for security orders. Additionally, the issuer workstation can present further interface elements therein. For example, the table 941 can include a manage transfer icon 944 (e.g., a manage ROFR icon) that can be responsive to a pending transfer approval 945 (e.g., a pending ROFR notification).

Upon selection of the manage transfer icon 944, pop-window can be presented by the platform 320 and/or the software tool 321 for further interaction by a user with the tracking ROFR in the dashboard. By way of example, the platform 320 and/or the software tool 321 generates and transmits STN including the standardized order data to and initiates a countdown for the ROFR for the issuer. The issuer can be a user of the company system 330. By providing automated STN and initiating the countdown, the platform 320 and/or the software tool 321 eliminate email traffic and reduces the potential for missed communications. Further, platform 320 and/or the software tool 321 provides the user interface so that the issuer can respond to the STN and the ROFR.

Figure 10:
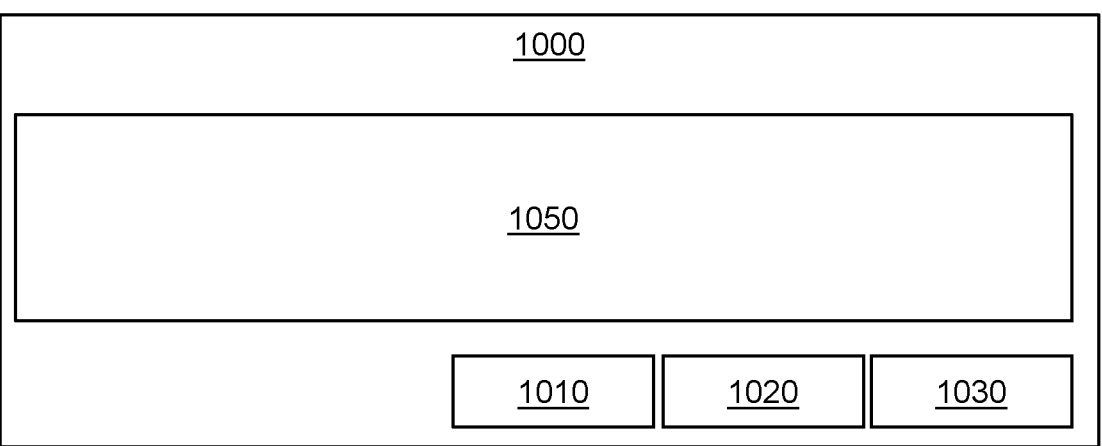
FIG. 10 depicts an example user interface according to one or more embodiments.

Turning to FIG. 10, an example user interface 1000 is presented according to one or more embodiments. The example user interface 1000 can be a pop-window that can include options to accept 1010 or reject 1020 the ROFR, as well as cancel 1030 from the menu or inputting corrective instructions in a comment box 1050.

Figure 11:
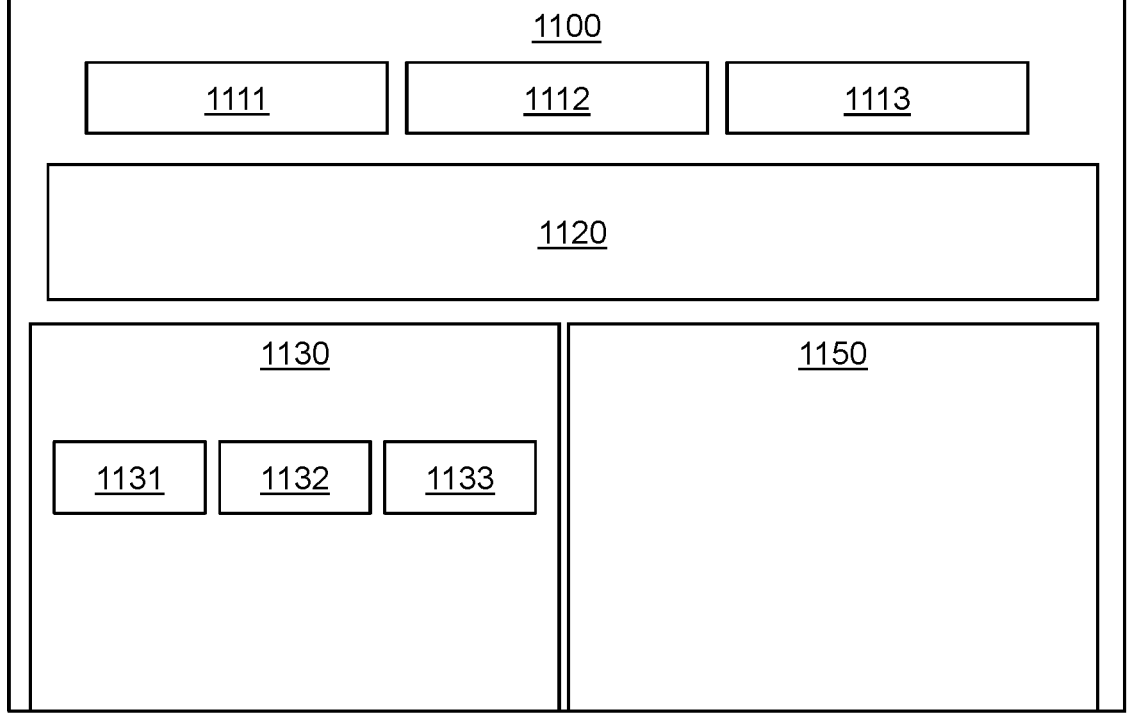
FIG. 11 depicts an example user interface according to one or more embodiments.

Turning to FIG. 11, an example user interface 1100 is presented according to one or more embodiments. The example user interface 1000 can be a match details dashboard that can include filled quantity frame 1111, a price frame 1112, a state frame 1113 (e.g., showing the state of the ROFR), a details frame 1120 (e.g., showing the details of the match). The example user interface 1000 can include a ROFR frame 1040 with options to waive 1131, assign 1132, or block 1133 the ROFR. The example user interface 1000 can include a timeline frame 1150 showing a history of when the match was created, notices were provided, etc.

At block 440, the platform 320 and/or the software tool 321 detects a transfer approval. For example, the issuer is provided a dashboard as "workstation" on the platform 320 to mark/input a decision with respect to a ROFR. The platform 320 provides one more options, including to waive, to assign, or to block the security order. The waiver is when the issuer a waives the ROFR. The assignment is when the issuer assigns the security order trade to a preferred buyer (different from the matched buyer). Note that preferred buyers can be stored on the platform 320. According to one or more embodiments, the platform 320 and/or the software tool 321 can automatically calculate a split among preferred buyers when more than one preferred buyer is assigned to a transaction. By way of example, if an original buyer is only allowed to buy 50% of a proposed holding for transfer, the platform 320 updates values to show the 50% of an original amount. The platform 320 then assigns the other 50% to a preferred buyer. The platform 320 also can display a breakdown across each participant for N number of participants (where N is an integer) in each assigned transfer. The block is when the issuer prevents the security order outright. The "Transfer Approval" process is a trigger for others operations of the method 400 (e.g., a transfer process). For example, the ROFR decision can be captured by the platform 320 and can serve as a trigger for others operations of the method 400 (e.g., a transfer process).

At block 445, the platform 320 and/or the software tool 321 determines a transfer fee. For example, the software tool 321 calculates the transfer fee for the security order. The transfer fee can be an issuer fee to cover costs of the security order.

At block 450, the platform 320 and/or the software tool 321 generates a STA. Each STA can be different for each security order. Further, each STA can also be different for each different companies. The software tool 321 can automatically determine and standardize the STAs on a per company basis. According to one or more embodiments, once the ROFR decision has been made (at block 440) and the STA has been generated, the platform 320 and/or the software tool 321 sends out automated notifications to the buyer 341 and the seller 351. The details within the STA can be automatically populated by the platform 320 ahead of the buyer and seller reviewing the STA to reduce errors. The automated notifications can include request for signatures and/or links to corresponding dashboards. That is, both the buyer 341 and the seller 351 can return to an investor "workstation" and provide their signatures on the STA.

Figure 12:
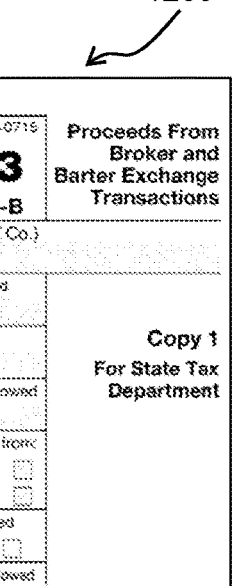
FIG. 12 depicts an example tax form according to one or more embodiments.

According to one or more embodiments, the platform 320 and/or the software tool 321 utilizes the security orders to support a paying agent process. By way of example, the seller 351 completes a W-9 or applicable W-8BEN form. The W-9 or applicable W-8BEN form can be submitted directly by the seller 351 or completed as part of an onboarding workflow of the platform 320 and/or the software tool 321. Note that the W-9 or applicable W-8BEN form can cause that the platform 320 and/or the software tool 321 to generate a 1099-B/Tax Form for the seller 351. FIG. 12 depicts an example tax form 1200 (e.g., 1099-B/Tax Form) that can be automatically generated, populated, and provided by the platform 320 and/or the software tool 321 according to one or more exemplary embodiments.

At block 460, the platform 320 and/or the software tool 321 tracks and stores received signatures. According to one or more embodiments, once the buyer 341 and the seller 351 sign the STA, the platform 320 notifies the company system 330 (notifies the issuer). The issuer is prompted to return to the platform 320 to sign the STA.

At dashed-block 460 (i.e., the dashes representing optionality), the platform 320 and/or the software tool 321 can collect and remit funds. In this regard, the platform 320 and/or the software tool 321 can provide paying agent operations. According to one or more embodiments, once the STA is fully executed by all three parties, the platform 320 sends notices to the buyer 341 to wire funds to a bank account known to the platform 320. The platform 320 receives the wire and remits to a bank account of the seller 351, which is also know by the platform 320.

According to one or more embodiments, once all transaction documents have been signed, the platform 320 and/or the software tool 321 provides the buyer 341 with wire instructions for an account for an exclusive benefit of customers (EBOC Account) supported by the platform 320 and/or the software tool 321. The platform 320 and/or the software tool 321 can instruct the buyer 341 to wire applicable gross proceeds to the EBOC Account. After the platform 320 and/or the software tool 321 confirms receipt of the wire, the platform 320 and/or the software tool 321 can remit a transfer fee, exercise costs, and tax withholdings (if applicable) to the company system 330, hold back fees, and/or remit the net proceeds to the seller 351.

At block 480, the platform 320 and/or the software tool 321 generates a timestamp for the STA. Generally, after at least three parties (e.g., buyer, seller, and issuer) sign STA and after a wire is sent, the platform 320 can generate the timestamp. The timestamp can indicate a transaction has finalized. According to one or more embodiments, after the wire has been sent and receipt confirmed, the platform 320 automatically generates one or more transaction confirmations with trade details and provides the one or more transaction confirmations to any required parties. According to one or more embodiments, once the STA is signed (e.g., the timestamp is generated for the STA), the platform 320 automatically generates one or more transaction confirmations with the trade details and provides the one or more transaction confirmations to any required parties. According to one or more embodiments, the timestamp generation can require the transfer fee of block 445.

According to one or more embodiments, the timestamp generation can be customized. For instance, users/parties/entities may want an immediate timestamp with respect to the populated STA. As shown in FIG. 4 by dashed arrow 481, the method 400 can alternatively proceed from block 450 directly to block 480 before returning to block 460 and 470 sequentially. Then, as the timestamp generation is complete, the method 400 can proceed directly to block 490.

At block 490, the platform 320 and/or the software tool 321 updates books and records. The books and records can be stored within the system 300 or outside the system. For instance, holdings are updated in any cap table associated with the security order, if outside of the system 300. The updates can include showing new ownership of a security, whether on behalf of the issuer using a third party system 360 or other registry product.

According to one or more embodiments, the platform 320 and/or the software tool 321 utilizes the one or more security orders to support a tax reporting process. For instance, if a W-9 is completed, at the request of the company system 330, the buyer 341, and/or the seller 351 (e.g., a shareholder, a broker-Dealer), the platform 320 and/or the software tool 321 generates applicable 1099-Bs for the seller 351 prior to a tax deadline. The 1099-B is downloadable through the platform 320 and/or the software tool 321 via an account for the seller 351. If a 1099-B is generated for the seller 351, the platform 320 and/or the software tool 321 can further report the sale to any governing tax organization.

Figure 13:
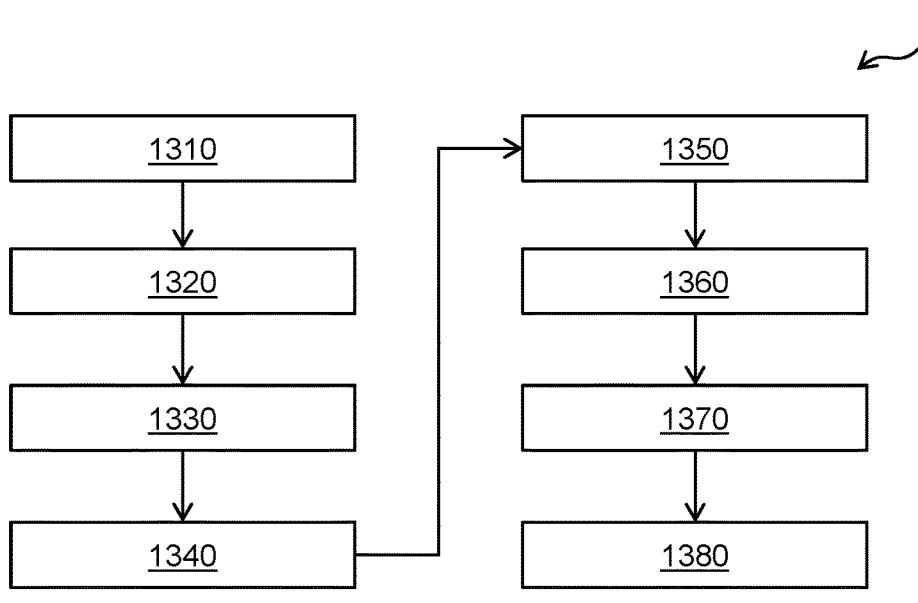
FIG. 13 depicts a method according to one or more embodiments.

FIG. 13 depicts a method 1300 according to one or more exemplary embodiments. The method 1300 is implemented by the private company securities platform. That is, the private company securities platform executes one or more operations of the method 1300 in combination to execute security transfers.

The method 1300 begins at block 1310, where the private company securities platform onboards a new buyer. To onboard a new buyer, the private company securities platform provides one or more dashboards via one or more user interfaces that receive user information to create a buyer account (e.g., a common stock investor).

Figure 14:
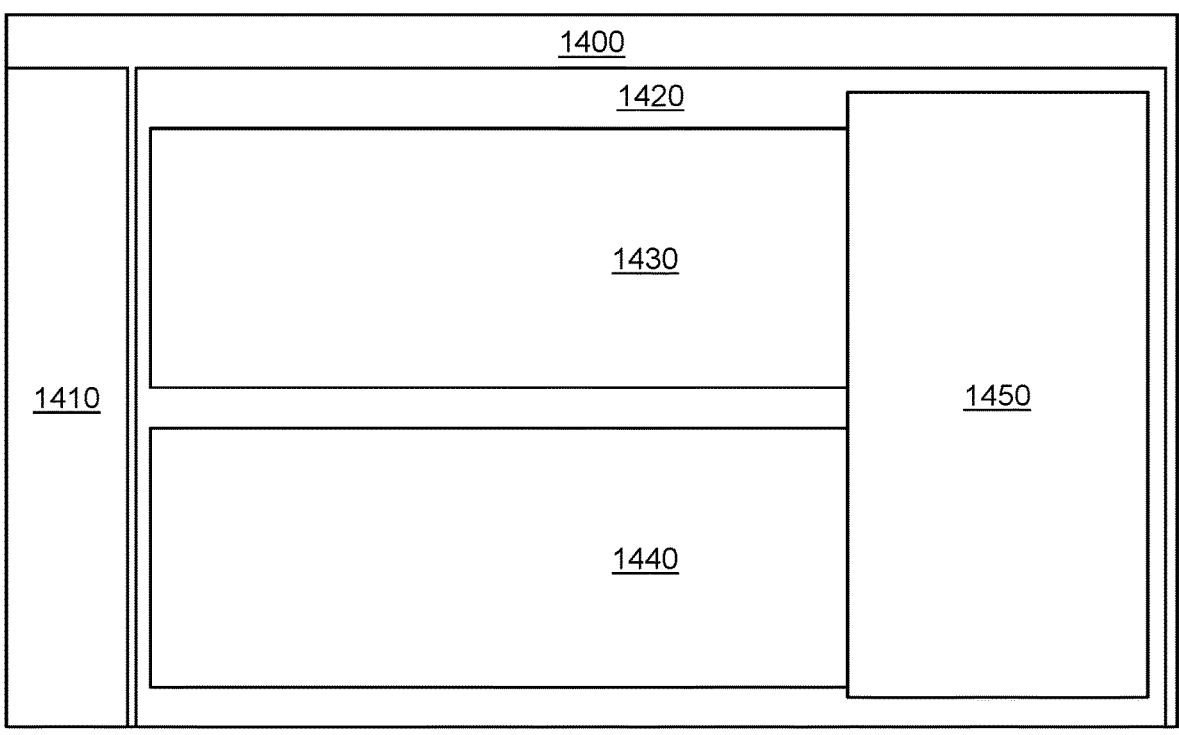
FIG. 14 depicts an example user interface according to one or more embodiments.

Turning to FIG. 14, an example user interface 1400 for new buyer onboarding of the issuer workstation is shown according to one or more embodiments. The example user interface 1400 includes a tool bar 1410, as well as a center frame 1420. The center frame 1420 shows tabs that can provide information in sub-frames to the new buyer. A sub-frame 1430 can show accounts, for example, permissioned accounts (e.g., all accounts with access to an event), permissioned activated accounts, and accounts with orders. A sub-frame 1440 can show reports, for example, permissioned accounts, permissioned users, in-depth event details, order status reports, and document activity. A sub-frame 1450 can be a drop-down menu for selecting an issuer for the new buyer.

Figure 15:
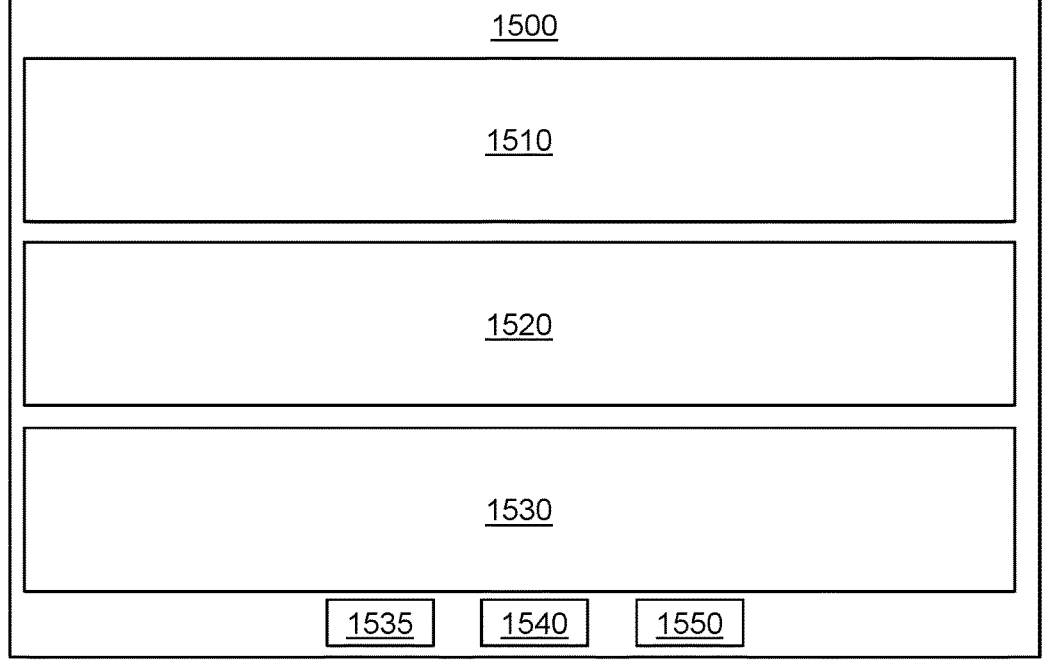
FIG. 15 depicts an example user interface according to one or more embodiments.

Turning to FIG. 15, an example user interface 1500 of the issuer workstation for onboarding for common stock investor is shown according to one or more embodiments. The example user interface 1500 includes fames 1510, 1520, and 1530. A first frame 1510 enables a selection of a bank account type, a brokerage account type, or other account type. A second frame 1520 enables input of bank information, for example, an routing number, a bank name, a name on an account, and a bank account number. A third frame 1530 enables input of additional instructions (which are optional), for example, additional wiring instructions. The example user interface 1500 can also include save, submit, and cancel interface elements 1535, 1540, and 1550.

At block 1320, the private company securities platform generates a sell order. The private company securities platform can generate the sell order based on inputs received by the private company securities platform as described herein. The sell order can have a match identification, holding information, state information (e.g., ROFR status), currency information, quantity information, price information, seller and buyer totals, and timestamps.

Figure 16:
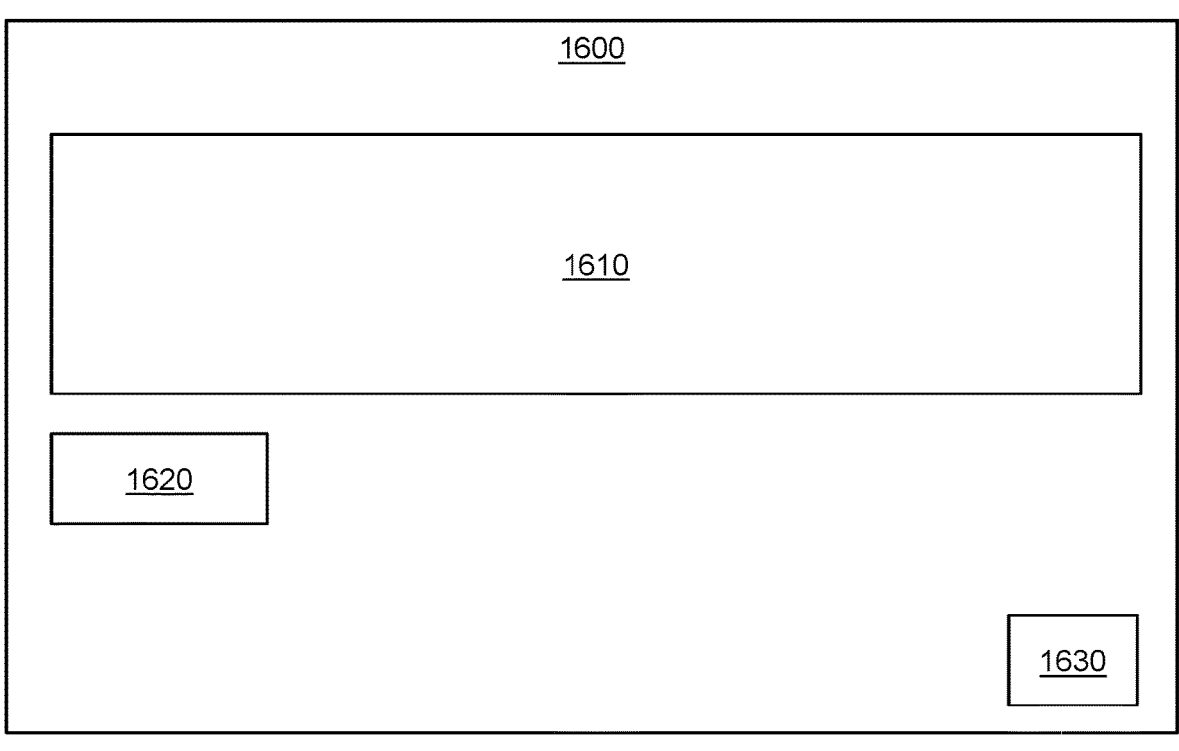
FIG. 16 depicts an example user interface according to one or more embodiments.

At block 1330, the private company securities platform requires a match to the sell order (e.g., match a buyer to the sell order). Turning to FIG. 16, an example user interface 1600 is provided according to one or more embodiments. The example user interface 1600 depicts the match 1610, which lists the information of the sell order. The example user interface 1600 shows that a buyer is needed within the match 1610. Proceeding to block 1340 of FIG. 13, the private company securities platform assigns a buyer. Returning to FIG. 16, an add buyer element 1620 enables the private company securities platform to assign the buyer (e.g., the buyer onboarded in block 1310). The example user interface 1600 can also include cancel interface element 1630. Accordingly, the private company securities send a notification to the buyer that a match has been made. The notification can include a ROFR.

Figure 17:
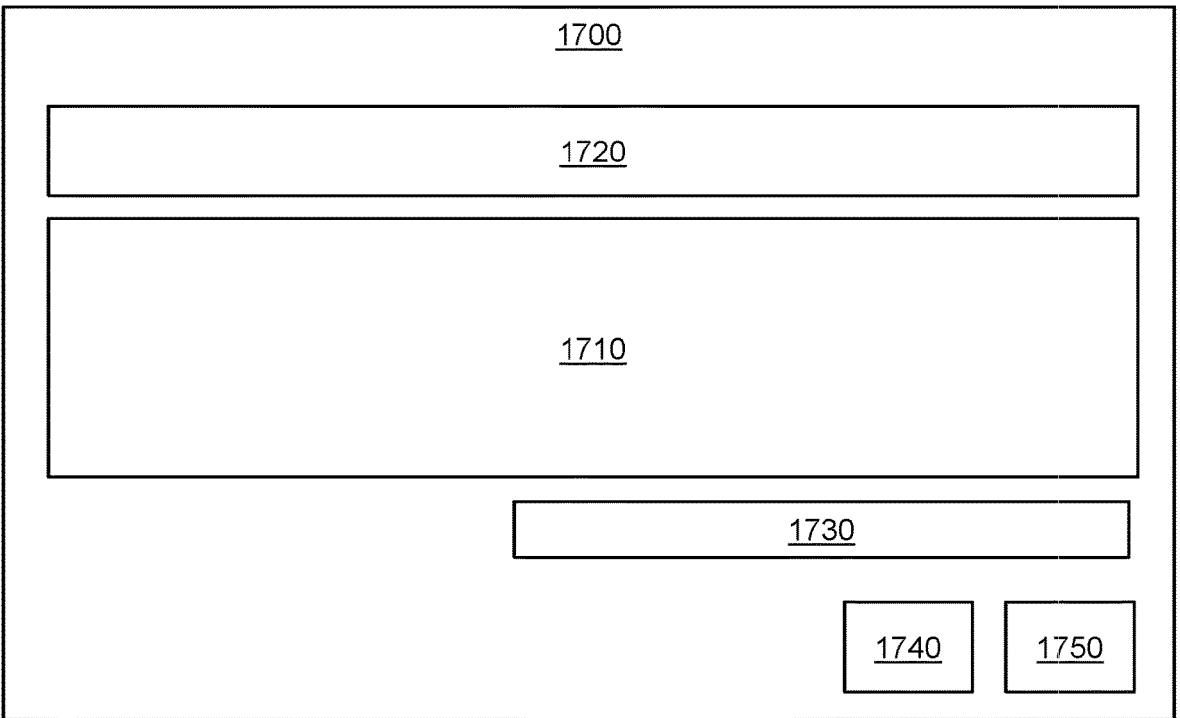
FIG. 17 depicts an example user interface according to one or more embodiments.

At block 1350, the private company securities platform receives an input, for example a transfer approval (e.g., manage transfer, ROFR input, etc.). The input can be received by direct input through the user interface of the private company securities platform, as via email or text message confirmation. Turning to FIG. 17, an example user interface 1700 is shown according to one or more embodiments. The example user interface 1700 can include the sell order 1710 and a text prompt 1720. The sell order 1710 can include a match identification, a issuance, a buy and sell order, holding information, state information (e.g., ROFR status), currency information, quantity information, price information, seller and buyer totals, and timestamps. The text prompt 1720 can indicate the transfer approval, for example, a block or a waive message. A block message can include "Are you sure you want to block this trade. The orders will be canceled and participants will be notified. This cannot be undone." A block message can also include "Are you sure you want to approve this trade? The orders will transition to final agreements and participants will be notified. This action cannot be undone." A waive message can include "Are you sure you want to waive your right of first refusal. The orders will be processed and participants will be notified. This cannot be undone." The example user interface 1700 can include a confirmation 1730, which indicates a verification of the transfer approval. The verification can include "I hereby attest that I have reviewed and verified this ROFR action. I understand that participants will be notified." The example user interface 1700 can also include submit and cancel interface elements 1740 and 1750.

Figure 18:
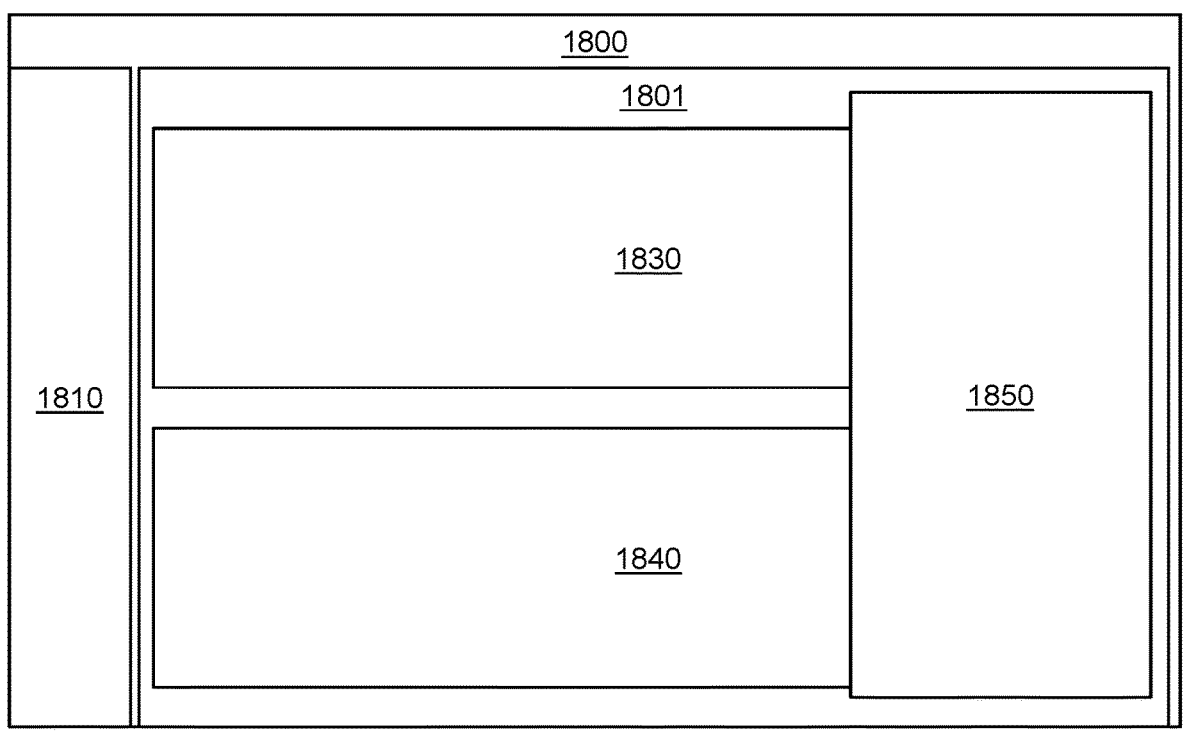
FIG. 18 depicts an example user interface according to one or more embodiments.
Figure 19:
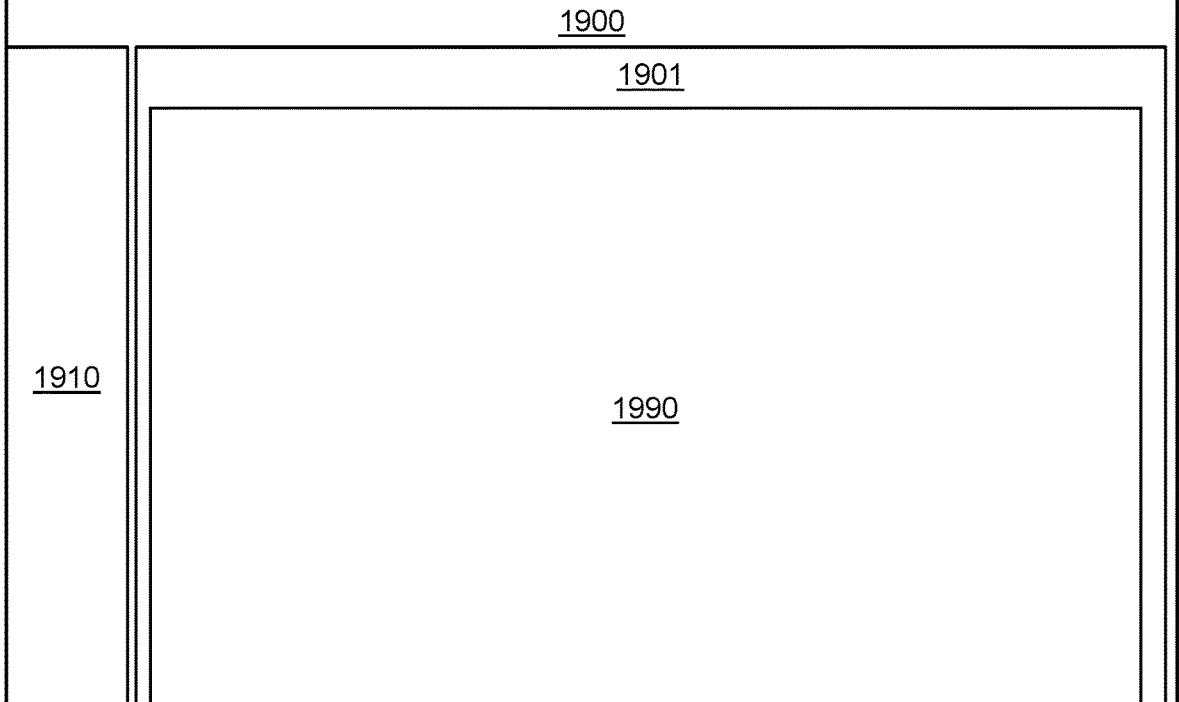
FIG. 19 depicts an example user interface according to one or more embodiments.

At block 1360, the private company securities platform generates an agreement. The agreement can be provided in one or more interfaces. Turning to FIGS. 18-19, example user interfaces 1800 and 1900 are depicted according to one or more exemplary embodiments FIG. 18 depicts the example user interface 1800 of an investor workstation according to one or more embodiments. The example user interface 1800 includes a central frame 1801 that is manipulated by selections within a toolbar frame 1810. The toolbar frame 1810 can include selectable menu items, for example general, marketplace, and programs. Under general, a dashboard for investors and a dashboard for stakeholders can be selected. Under marketplace, options for issuance, unverified holdings, holdings, matches, agreements, and transaction confirmations can be selected. Under programs, options for active programs and expired programs can be selected. An 'Agreements' dashboard can be access by selecting an agreements option of the toolbar frame 1810. When the 'Agreements' dashboard is accessed in the investor workstation, the central frame 1801 can provide information in sub-frames to the investor (e.g., the new buyer). A sub-frame 1830 can show an agreement search menu. A sub-frame 1840 can outstanding agreements that need signature and corresponding user interface elements to sign the outstanding agreement. A sub-frame 1450 can be a drop-down menu for selecting alternative workstations.

FIG. 19 depicts the example user interface 1900 of an issuer workstation according to one or more embodiments. The example user interface 1900 includes a central frame 1901 that is manipulated by selections within a toolbar frame 1910. The toolbar frame 1910 can include selectable menu items, for example general, marketplace, and programs. Under general, a dashboard for investors and a dashboard for stakeholders can be selected. Under marketplace, options for issuance, unverified holdings, holdings, matches, agreements, and transaction confirmations can be selected. Under programs, options for active programs and expired programs can be selected. An 'Agreements' dashboard can be access by selecting an agreements option of the toolbar frame 1910. When the 'Agreements' dashboard is accessed in the issuer workstation, the central frame 1901 can provide an agreements menu 1990. The agreements menu 1990 can switch between agreements to sign and signed agreements.

Figure 20:
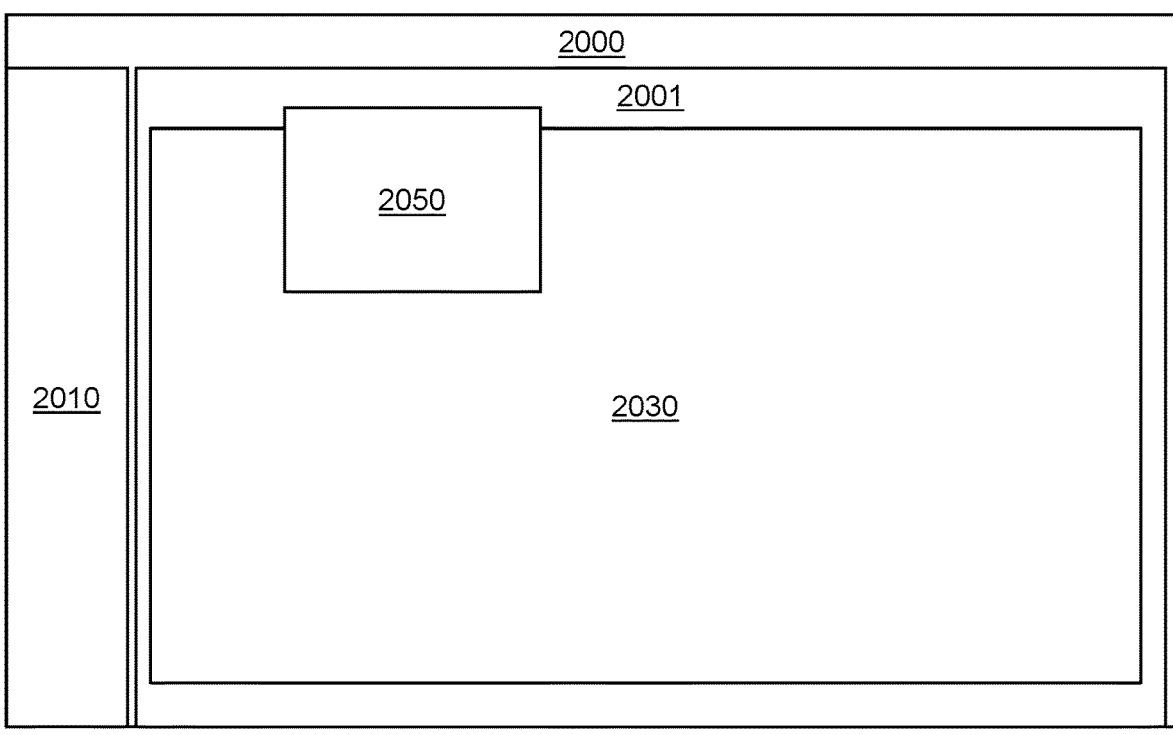
FIG. 20 depicts an example user interface according to one or more embodiments.

At block 1370, the private company securities platform provides a transaction confirmation. FIG. 20 depicts an example user interface 2000 according to one or more embodiments. The example user interface 2000 includes a central frame 2001 that is manipulated by selections within a toolbar frame 2010. The toolbar frame 2010 can include selectable menu items, for example general, marketplace, and programs. The central frame 2001 can provide a match transaction confirmation 2030. A sub-frame 2050 can be a pop-up menu for selecting new tabs, new windows, inspections, etc.

At block 1380, the private company securities platform generates a summary (e.g., a transaction) in the interface.

Figure 21:
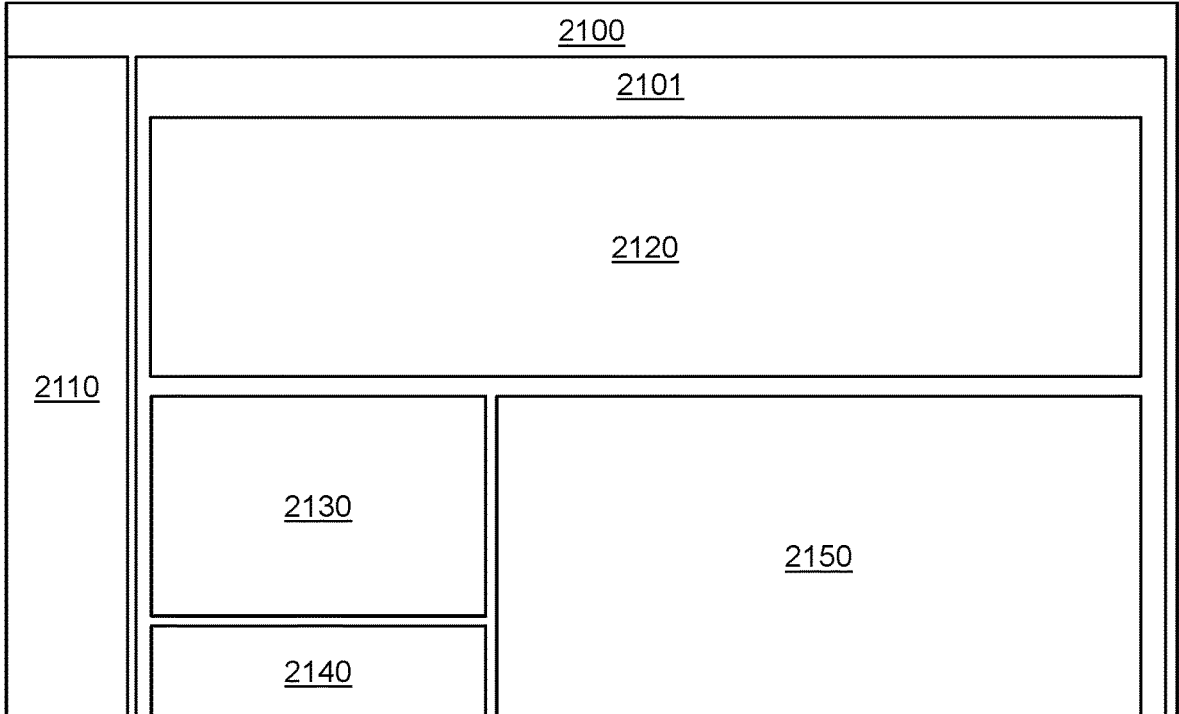
FIG. 21 depicts an example user interface according to one or more embodiments.

FIG. 21 depicts an example user interface 2100 according to one or more embodiments The example user interface 2100 includes a central frame 2101 that is manipulated by selections within a toolbar frame 2110. The toolbar frame 2110 can include selectable menu items, for example general, marketplace, and programs. A 'Matches' dashboard can be access by selecting a matches option of the toolbar frame 2110. When the 'Matches' dashboard is accessed, the central frame 2101 can provide the summary across a match 2120, a ROFR status 2130, an agreements menu 2140, and a timeline frame 2150.

Figure 22:
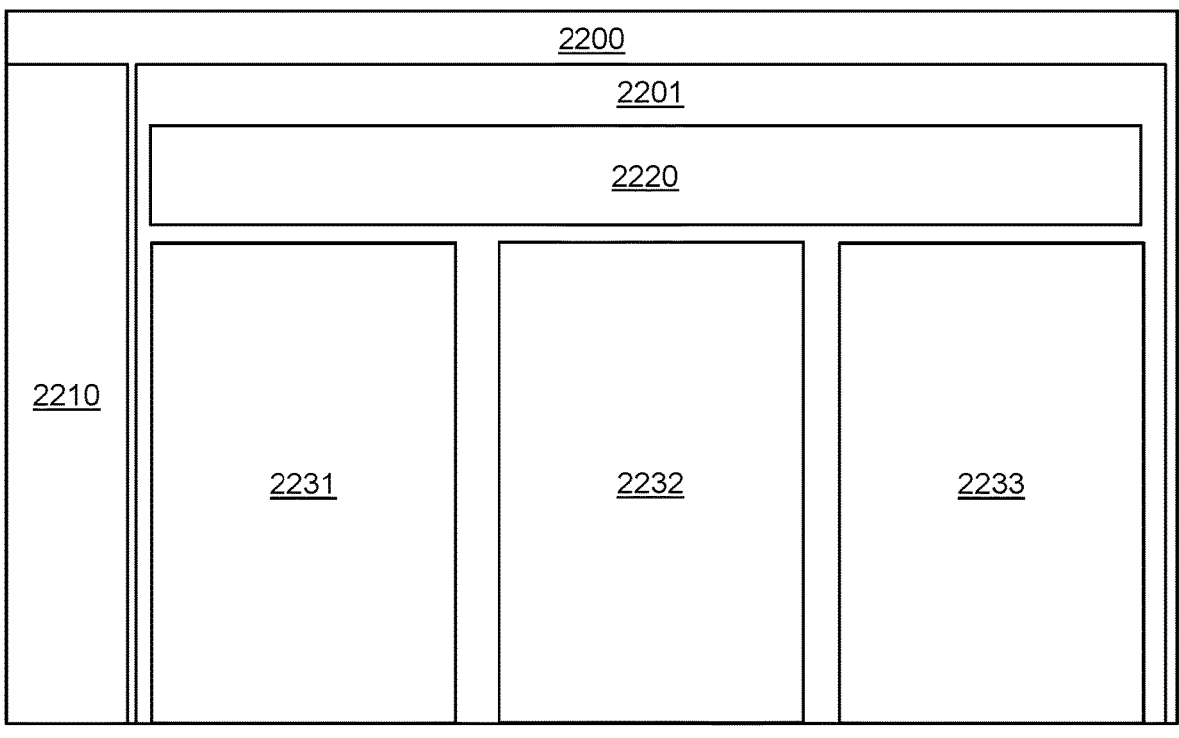
FIG. 22 depicts an example user interface according to one or more embodiments.

FIG. 22 depicts an example user interface 2200 according to one or more embodiments. The example user interface 2200 includes a central frame 2201 that is manipulated by selections within a toolbar frame 2210. The toolbar frame 2210 can include selectable menu items, for example general, marketplace, and programs. A 'Live Programs' dashboard can be access by selecting a programs option of the toolbar frame 2110. When the 'Live Programs' dashboard is accessed, the central frame 2101 can provide a search bar 2110 and a plurality of programs 2231, 2232, and 2233, each of which showing a summary of that program (as generated by the private company securities platform).

FIG. 23 illustrates a method 2300 according to one or more embodiments. The method 2300 is implemented by the private company securities platform. The method 2300 begins at block 2310, where one or more users are on-boarded. The one or more users can include, but are not limited to, a buyer, a seller, an administrator, and a bank. For each user, an account is created. Accounts can be previously created through other services by the private company securities platform and connected to a respective transfer. Onboard can also generate non-standardized information regarding the users. For example, an onboarding question-naire or investor questionnaire can be completed to assess a new buyer's fit with a company. Through the private com-pany securities platform, the company can have an oppor-tunity to review the information and/or order details prior to approving a transfer, which can be done on the platform.

According to one or more embodiments, the private company securities platform also provides an ability to collect a list of preferred buyers or users that do not need to go through a requirements ahead of transfer restrictions being waived and moving to document signing. According to one or more embodiments, the private company securities platform provides an ability to pre-waive transfer restric-tions given an issuer's consent and other factors for waiving the transfer restrictions, for example, price floors, size of trades, specific transferring entities and more. The private company securities platform, thus, can track pre-waiver and further expedite the method 2300.

At block 2315, the private company securities platform facilitates a buyer and a seller agreeing to a transaction (e.g., matched order details). A key component to the private company securities platform is that the private company securities platform can created the transfer notice based on the matched order details. In this regard, private company securities platform does not require the receipt of a transfer notice to match the buyer and seller or facilitate the trans-action agreement.

At block 2320, the private company securities platform generates an order before the transfer notice. According to one or more embodiments, orders can be generated before or after the transfer notice. As noted herein, orders are non-standardized across the industry and often come with dif-ferent information. The order can be standardized by the private company securities platform in an order page of a user interface.

At block 2325, the private company securities platform provides a notification to the company of the transaction. According to one or more embodiments, notification occurs automatically from the private company securities platform once a matched security order is received.

At block 2330, the private company securities platform receives an input as described herein. By way of example, the seller submits a sell order in a non-standardized format by uploading non-standardized information into a user inter-face of the private company securities platform.

At block 2335, the private company securities platform updates the non-standardized information into a standard-ized order format to generate a security order including standardized order data. The security order includes all the non-standardized information provided with the sell order but converted into standardized order data.

At block 2340, the private company securities platform stores the security order within the private company secu-rities platform. By automatically storing the standardized order data, the private company securities platform can generate and track documents to reduce misplacing infor-mation or requiring rework to sign multiple documents of a same format and substance.

At block 2345, the private company securities platform populates a user interface with the security order so that the administrator (and the seller) can access and interact with the security order.

At block 2350, the private company securities platform populates or assigns a buyer to the security order, for example, depending on approval. For instance, if a transac-tion is not approved, the issuer cannot waive the ROFR or assign a buyer. Further, If a transfer is approved, an original buyer that was provided in the transfer notice continues (e.g., with the remaining steps in the process), and an administrator of the private company securities platform does not assign actions. Note that the private company securities platform enables the assignment of a buyer when a transfer is not outright approved or rejected. This operation can be considered matching the buyer. The matching can be assisted by the administrator who has access and interact with the security order.

At block 2355, the private company securities platform automatically generates and transmits a notification. The notification can include the standardized order data to an issuer. The notification to the company can also occur earlier in the method 2300 (e.g., at block 2325) if an order is received and the private company securities platform is responsible for notifying the company.

At block 2360, the private company securities platform automatically generates and transmits a plurality of notifi-cations to all parties to the security order. The plurality of second notifications requesting a plurality of signatures for one or more documents, for example, a transfer agreement (e.g., a stock transfer agreements or STA), an investor agreement, and/or an option exercise notice.

At block 2370, the private company securities platform a wiring of funds is initiated. According to one or more embodiments, the T&S application or tool of the private company securities platform automatically initiates wire transfers of money once the transfer agreement is fully executed. According to one or more embodiments, wiring funds can occur before an agreement is fully executed. In some cases, the company wants to confirm that the seller has the funds in an account prior to adding a signature to a transfer agreement. In other cases, the agreement is fully executed and then the funds are wired. According to one or more embodiments, the private company securities platform can also remit any applicable withholdings to any party in the transaction, including but not limited to tax withhold-ings, exercise costs, and broker fees from the buyer and the seller.

At block 2380, the private company securities platform automatically generating a transaction confirmation and/or a transaction summary.

The flowchart and block diagrams in the Figures illustrate the architecture, functionality, and operation of possible implementations of systems, methods, and computer pro-gram products according to various embodiments of the present invention. In this regard, each block in the flowchart or block diagrams may represent a module, segment, or portion of instructions, which comprises one or more executable instructions for implementing the specified logi-cal function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. Further, features and elements described herein, as well as the one or more corresponding operations, can be performed individually or in combination in any of an online environment, an offline environment, a backend processing environment, a local processing environment, a remote processing environment, a cloud processing environment, and/or other environment. In addition, the methods described herein may be implemented in a computer program, software, or firmware incorporated in a computer-readable medium for execution by a computer or processor. A computer readable medium, as used herein, is not to be construed as being transitory signals per se, for example, radio waves or other freely propagating electromagnetic waves, electromagnetic waves propagating through a waveguide or other transmission media (e.g., light pulses passing through a fiber-optic cable), or electrical signals transmitted through a wire.

Examples of computer-readable media include electrical signals (transmitted over wired or wireless connections) and computer-readable storage media. Examples of computer-readable storage media include, but are not limited to, a register, cache memory, semiconductor memory devices, magnetic media (e.g., internal hard disks and removable disks), magneto-optical media, optical media (e.g., compact disks (CD) and digital versatile disks (DVDs)), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented by a private company securities platform executing on at least one processor, the method comprising:
  receiving an input in a non-standardized format and comprising non-standardized information for a security order associated with an issuer;
  communicating with an application programming interface (API) of the private company securities platform using an API protocol, wherein the API provides a standardization process that enables converting data in at least the non-standardized format to a standardized order format;
  converting the non-standardized information into the standardized order format using the standardization process via the API;
  generating the security order comprising standardized order data based on the non-standardized information converted, wherein the standardized order data standardizes the input for automatic entry by the private company securities platform into user interfaces (UIs) configured for interacting with the security order;
  automatically generating and populating, within a first UI on a first device associated with the issuer, a first notification including the standardized order data to the issuer, the populating of the first notification triggering a countdown for a transaction approval for the issuer automatically in the first UI and with the private company securities platform without further input from the issuer; and
  automatically generating and populating, within the first UI and at least one second UI on at least one second device, a plurality of second notifications to all parties to the security order, the plurality of second notifications requesting a plurality of signatures in the first UI and the at least one second UI for a transfer agreement including the standardized order data.

2. The method of claim 1, wherein the method comprises automatically generating a transaction confirmation upon receipt of the plurality of signatures.

3. The method of claim 1, wherein the method comprises storing the security order within the private company securities platform.

4. The method of claim 1, wherein the standardized order data comprising one or more of a buyer name, a seller name, shares being transferred, price per share, and issuer name in the standardized order format.

5. The method of claim 1, wherein the input comprises a transfer notice.

6. The method of claim 1, wherein the non-standardized information is associated with one of an order, intent to sell, or terms for a sale or transfer a security in a company.

7. The method of claim 1, wherein the transaction approval comprises a right of first refusal.

8. The method of claim 7, wherein the right of first refusal is associated with a status comprising pending, accepted, rejected, blocked, waived, or hold.

9. The method of claim 1, wherein the first notification comprises the standardized order data and an approval for a right of first refusal for the issuer.

10. The method of claim 1, wherein the transfer agreement is automatically generated by the private company securities platform based on the standardized order data.

11. A system implementing a private company securities platform, the system comprising:
  at least one memory storing processor executable code for the private company securities platform;

at least one processor executing the processor executable code to cause the private company securities platform and the system to:

receive an input in a non-standardized format and comprising non-standardized information for a security order associated with an issuer;

communicate with an application programming interface (API) of the private company securities platform using an API protocol, wherein the API provides a standardization process that enables converting data in at least the non-standardized format to a standardized order format;

convert the non-standardized information into the standardized order format using the standardization process via the API;

generate the security order comprising standardized order data based on the non-standardized information converted, wherein the standardized order data standardizes the input for automatic entry by the private company securities platform into user interfaces (UIs) configured for interacting with the security order;

automatically generate and populate, within a first UI on a first device associated with the issuer, a first notification including the standardized order data to the issuer, transmission of the first notification triggering a countdown for a transaction approval for the issuer automatically in the first UI and with the private company securities platform without further input from the issuer; and automatically generate and populate, within the first UI and at least one second UI on at least one second device, a plurality of second notifications to all parties to the security order, the plurality of second notifications requesting a plurality of signatures in the first UI and the at least one second UI for a transfer agreement including the standardized order data.

12. The system of claim 11, wherein the at least one processor executes the processor executable code to cause the private company securities platform and the system to automatically generate a transaction confirmation upon receipt of the plurality of signatures.

13. The system of claim 11, wherein the at least one processor executes the processor executable code to cause the private company securities platform and the system to store the security order within the private company securities platform.

14. The system of claim 11, wherein the standardized order data comprising one or more of a buyer name, a seller name, shares being transferred, price per share, and issuer name in the standardized order format.

15. The system of claim 11, wherein the input comprises a transfer notice.

16. The system of claim 11, wherein the non-standardized information is associated with one of an order, intent to sell, or terms for a sale or transfer a security in a company.

17. The system of claim 11, wherein the transaction approval comprises a right of first refusal.

18. The system of claim 17, wherein the right of first refusal is associated with a status comprising pending, accepted, rejected, blocked, waived, or hold.

19. The system of claim 11, wherein the first notification comprises the standardized order data and an approval for a right of first refusal for the issuer.

20. The system of claim 11, wherein the transfer agreement is automatically generated by the private company securities platform based on the standardized order data.

* * * * *